US012111081B2

(12) United States Patent
Worthington

(10) Patent No.: US 12,111,081 B2
(45) Date of Patent: Oct. 8, 2024

(54) MULTI-CHAMBER SOLAR COLLECTOR

(71) Applicant: Richard John Worthington, South Australia (AU)

(72) Inventor: Richard John Worthington, South Australia (AU)

(73) Assignee: Richard John Worthington (AU)

( * ) Notice: Subject to any disclaimer, the term of this patent is extended or adjusted under 35 U.S.C. 154(b) by 459 days.

(21) Appl. No.: 17/430,610

(22) PCT Filed: Feb. 13, 2020

(86) PCT No.: PCT/AU2020/050121
§ 371 (c)(1),
(2) Date: Aug. 12, 2021

(87) PCT Pub. No.: WO2020/163914
PCT Pub. Date: Aug. 20, 2020

(65) Prior Publication Data
US 2022/0146152 A1  May 12, 2022

(30) Foreign Application Priority Data

Feb. 13, 2019  (AU) ................. 2019900463
Mar. 29, 2019  (AU) ................. 2019901056

(51) Int. Cl.
*F24S 80/30* (2018.01)
*F24S 70/60* (2018.01)
*G05D 7/06* (2006.01)

(52) U.S. Cl.
CPC ............... *F24S 80/30* (2018.05); *F24S 70/60* (2018.05); *G05D 7/0641* (2013.01)

(58) Field of Classification Search
CPC ......... F24S 80/30; F24S 70/60; G05D 7/0641
(Continued)

(56) References Cited

U.S. PATENT DOCUMENTS 4,253,491 A  *  3/1981  Worthen ................. F24S 50/00
                                                              165/47
5,351,488 A  *  10/1994  Sorensen ................ F03G 6/003
                                                              417/208
(Continued)

FOREIGN PATENT DOCUMENTS

CN       105756873 B    9/2018
WO    2015/074109 A1    5/2015

OTHER PUBLICATIONS

Written Opinion of the International Searching Authority issued in connection with PCT/AU2020/050121, dated Apr. 28, 2020.
(Continued)

*Primary Examiner* — Avinash A Savani
(74) *Attorney, Agent, or Firm* — Akerman LLP

(57) ABSTRACT

The present invention provides an apparatus for heating a fluid using solar energy. The apparatus comprises: a fluid source, a first chamber comprising a fluid inlet to allow one-way movement of a fluid from the fluid source to the first chamber, a second chamber comprising a fluid outlet to allow the controlled movement of a fluid internal the second chamber to a further chamber or external the apparatus, and a fluid connection between the first and second chambers to allow substantially one-way movement of a fluid from the first chamber to the second chamber. Each of the chambers is fluid tight and configured as a solar collector to heat a fluid therein. The apparatus as a whole operates such that under even incident solar radiation a fluid is heated in each of the chambers and upon thermal expansion of the fluid, the fluid is moved in a controlled manner substantially one-way from the first chamber to the second chamber, and from the second chamber to a further chamber or to the outside the apparatus. By the movement of fluid from the first chamber to the second chamber, the first chamber donates a portion of the heat energy held by the fluid therein to the second (Continued)

chamber, the second chamber becomes enriched in heat energy by the gain of fluid and the first chamber becomes deprived in energy by the loss of fluid such that the second chamber contains fluid that is hotter than the first chamber.

12 Claims, 8 Drawing Sheets

(58) Field of Classification Search
USPC .......................................................... 126/584
See application file for complete search history.

(56) References Cited

U.S. PATENT DOCUMENTS

| | | | |
|---|---|---|---|
| 5,511,954 A * | 4/1996 | Han | ........................ F24S 23/00 |
| | | | 417/209 |
| 9,745,964 B2 * | 8/2017 | Ungerer | ................... F03G 6/003 |
| 2012/0144831 A1 * | 6/2012 | Feldhoff | ................. F22B 1/006 |
| | | | 60/653 |
| 2013/0014843 A1 | 1/2013 | Wright | |
| 2015/0128931 A1 * | 5/2015 | Joshi | ........................ F03G 6/067 |
| | | | 126/714 |
| 2015/0337811 A1 | 11/2015 | Chen et al. | |
| 2017/0067667 A1 * | 3/2017 | Choi | ........................ F24S 60/10 |

OTHER PUBLICATIONS

International Search Report issued in connection with PCT/AU2020/050121, dated Apr. 28, 2020.

* cited by examiner

MULTI-CHAMBER SOLAR COLLECTOR

CROSS-REFERENCE TO RELATED APPLICATIONS

This application is a national phase of PCT/AU2020/050121, filed Feb. 13, 2020, and claims priority to AU 2019900463, filed Feb. 13, 2019, and AU 2019901056, filed Mar. 29, 2019, the entire contents of all of which are hereby incorporated by reference.

FIELD OF THE INVENTION

The present invention relates to solar collectors of the type that heat a fluid such as liquid water or air. The heated fluid may be used directly (for example to heat a habitable room, or domestic hot water) or indirectly (for example to do mechanical work by driving a turbine).

BACKGROUND TO THE INVENTION

Many contrivances are known for the harvesting of thermal energy from solar radiation. Typically, an elongate tubular solar absorber is exposed to sunlight while a heat transfer medium of some description is passed through the lumen of the absorber. The absorber is typically metallic and dark in colour such that thermal energy is captured and conveyed to the medium passing through the lumen. Thus, medium passing through the absorber is heated and upon exit from the absorber may be used for any suitable purpose.

The heat transfer medium may be air or water, which in heated form may be used to drive a turbine to produce electricity. Alternatively, the heated air or water may be used directly. For example, heated air may be used in an industrial drying process or in the home to heat a room. Solar heated water may be used directly in a domestic shower or as a solvent in an industrial process.

In some arrangements the heat transfer medium may be an oil which is recirculated throughout a system, with heat being extracted from the medium in one part of the recirculation system and heat added by the solar collector apparatus.

A problem exists in the art is that the medium is often not heated to a sufficiently high temperature for the intended purpose. In some instances, the deficiency arises from limitations in the apparatus itself. For example the amount of solar radiation that can be absorbed may be limited due to the size of a parabolic mirror or the suboptimal heat transfer properties of an absorber wall. In other circumstances, the deficiency arises due to low levels of available solar radiation due to cloud cover or the low angle of the sun in the sky.

In order to boost the temperature of the fluid output, supplementary heating means such as a gas fired or electrically powered heater may be required. Of course, these add to the expense of an installation and will preferably be avoided.

Alternatively, a parabolic mirror of significant size may be used to concentrate a larger amount of solar radiation onto the absorber. Larger mirrors are more expensive to fabricate, take up more space and require extensive supporting framework to stabilise against the action of wind. As an extension of this strategy the absorber tube may be lengthened so as to provide a longer contact period of the heat transfer medium to the absorber.

As a further alternative, the flow rate of the heat transfer medium may be slowed through the absorber. This strategy will be effective up to a point, however in some circumstances, such slowing may still be insufficient to elevate the temperature of the fluid to that required.

Of course, problems of insufficient heating arise in many other types of solar collectors. A further example is that of domestic hot water systems mounted on the roof of a home. In these systems, a number of absorber tubes are disposed parallel to each other within a shallow rectangular housing. Alternatively, the absorber may be in the form of a plate. As will be appreciated, the lack of any curved reflector to concentrate solar radiation in these systems results in a water output temperature that is relatively low. It is therefore typical for the water output to be heated up to a minimum acceptable temperature for use within the home (typically 60 degrees Celsius). Thus, while domestic solar hot water systems can save some energy costs, these systems could be significantly improved if output water temperature could be increased.

It is an aspect of the present invention to provide an improvement to prior art solar collectors so as to increase the temperature of an output fluid. It is a further aspect of the present invention to provide a useful alternative to prior art solar collectors.

The discussion of documents, acts, materials, devices, articles and the like is included in this specification solely for the purpose of providing a context for the present invention. It is not suggested or represented that any or all of these matters formed part of the prior art base or were common general knowledge in the field relevant to the present invention as it existed before the priority date of each provisional claim of this application.

SUMMARY OF THE INVENTION

In one embodiment, but not necessarily the broadest embodiment, the present invention provides an apparatus for heating a fluid using solar energy, the apparatus comprising: (i) a fluid source, (ii) a first chamber comprising a fluid inlet configured to allow substantially one-way movement of a fluid from the fluid source to the first chamber, (iii) a second chamber comprising a fluid outlet configured to allow the controlled movement of a fluid internal the second chamber to a further chamber or external the apparatus, and (iv) a fluid connection between the first and second chambers configured to allow substantially one-way movement of a fluid from the first chamber to the second chamber, wherein each of the first and second chambers is substantially fluid tight and configured as a solar collector to heat a fluid therein, and the apparatus is configured such that in use and under even incident solar radiation a fluid is heated in each of the first and second chambers and upon thermal expansion of the fluid, the fluid is moved in a controlled manner substantially one-way from the first chamber to the second chamber, and from the second chamber to a further chamber or external the apparatus, and wherein when the second chamber commences reception of fluid from the first chamber, the second chamber has already supplied fluid to a further chamber or external the apparatus, and wherein by the movement of fluid from the first chamber to the second chamber, the first chamber donates a portion of the heat energy held by the fluid therein to the second chamber, the second chamber becoming enriched in heat energy by the gain of fluid and the first chamber becoming deprived in energy by the loss of fluid such that the second chamber contains fluid that is hotter than the first chamber.

In one embodiment of the first aspect, the outlet of the second chamber is configured to allow substantially one-way movement of a fluid from the second chamber to a further chamber or external the second chamber.

In one embodiment of the first aspect, the fluid outlet of the second chamber is configured to be controllable by a human user or a processor functioning under software instructions.

In one embodiment of the first aspect, the fluid outlet of the second chamber is configured to intrinsically control movement of a fluid from the first chamber to external the second chamber.

In one embodiment of the first aspect, the apparatus comprises one or more sensors configured to sense any one or more of: the pressure of a fluid within the first chamber (or a proxy thereof), the temperature of a fluid within the first chamber (or a proxy thereof), the pressure of a fluid within the second chamber (or a proxy thereof), the temperature of a fluid within the second chamber (or a proxy thereof), the temperature of a fluid external the apparatus (or a proxy thereof) and the pressure of a fluid external the apparatus (or a proxy thereof), wherein the sensor is in operable connection with fluid outlet of the second chamber such that upon the one or more sensors sensing one or more predetermined temperature(s) and/or pressure(s) the outlet moves from a first fluid flow state to a second fluid flow state.

In one embodiment of the first aspect, the first or second fluid flow state is independently zero fluid flow, maximum fluid flow or an intermediate fluid flow.

In one embodiment of the first aspect, the first and second chambers are configured to contain a fluid under pressure In one embodiment of the first aspect, the first and the second chambers are each configured to heat a fluid internal thereto either via incidence of solar radiation on a chamber wall or incidence of solar radiation on a radiation absorber within the chamber.

In one embodiment of the first aspect, the apparatus comprises a solar radiation absorber internal each of the first and second chambers, and wherein each of the first and second chambers comprises a wall or a wall portion allowing incoming solar radiation to pass internal the chamber and incide on the solar radiation absorber.

In one embodiment of the first aspect, the solar radiation absorber has a convoluted surface so as to increase surface area available to receive incident solar radiation.

In one embodiment of the first aspect, the first and second chambers are thermally isolated from (i) each other, and (ii) the environment.

In one embodiment of the first aspect, the apparatus comprises a fluid within the first and second chambers.

In one embodiment of the first aspect, the fluid is a gas (such as air) or a liquid (such as water or other flowable heat transfer medium).

In one embodiment of the first aspect, the apparatus is configured such that after being exposed to solar radiation such that a fluid in the first and second chamber are heated and pressurized to a supra-atmospheric pressure, and when a portion of the heated fluid in the second chamber is allowed to exit therefrom via the fluid outlet of the second chamber, fluid remaining in the second chamber is heated by the solar radiation at a rate faster than fluid in the first chamber.

In one embodiment of the first aspect, the apparatus comprises one or more intermediate chambers disposed between the first and second chambers to form a chain of chambers defining a fluid path from the first chamber of the chain to the last chamber of the chain, each of the intermediate chambers being in a fluid connection with an adjacent chamber of the chain by way of a fluid connection configured to allow substantially one-way movement of a fluid sequentially from the first chamber to the chain of intermediate chambers, and from the chain of intermediate chambers to the second chamber.

In one embodiment of the first aspect, any or all of the one or more intermediate chambers has a feature as defined for the first or second chamber in any embodiment of the apparatus of the first aspect.

In one embodiment of the first aspect, the first and second chamber, and any intermediate chamber (where present) are shaped and/or dimensioned so as to be substantially identical to each other.

In a second aspect, the present invention provides a system for heating a fluid, the system comprising a fluid source in fluid connection with the fluid inlet of the first chamber of the apparatus of any embodiment of the first aspect.

In one embodiment of the second aspect, the heated fluid is drawn from the outlet of the second chamber and used directly, or used indirectly in which case the system further comprises a heat exchanger and the system configured such that a heated fluid drawn from the outlet of the second chamber is conveyed to the heat exchanger and used to heat a second fluid in contact therewith.

In a third aspect, the present invention provides a system for performing work, the system comprising a first sub-system being the apparatus of any one of claims 1 to 8 and 12 and a second sub-system being a work output component configured to directly or indirectly utilize thermal energy or kinetic energy present in a fluid that has exited the outlet of the second chamber.

In a fourth aspect, the present invention provides a method for heating a fluid using solar energy, the method comprising the steps of: (i) supplying an input fluid, (ii) dividing the input fluid into a first fluid body and a second fluid body such that the first and second fluid body can achieve and maintain temperatures different to each other and also different to the environment, the division of the first and second fluid bodies being such that movement of fluid from the first to second fluid body is possible, but movement from the second to the first fluid body is impossible, (iii) heating the first and second fluid bodies using solar radiation for a period such that each of the first and second fluid bodies achieves an elevated temperature, (iv) removing fluid from the second fluid body while preventing any movement of fluid from the first fluid body to the second fluid body, and (v) further heating the first and second fluid bodies using solar radiation for a period such that the second fluid body achieves a higher temperature than the first fluid body.

In one embodiment of the fourth aspect, the method comprises the step of moving a volume of fluid from the second fluid after the second fluid body achieves a higher temperature than the first fluid body, or allowing a volume of fluid to be moved from the second fluid after the second fluid body achieves a higher temperature than the first fluid body.

In one embodiment of the fourth aspect, the method comprises the steps of: moving a volume of fluid from the first fluid body to the second fluid body or allowing a volume of fluid to be moved from the first fluid body to the second fluid body; and moving a volume of input fluid into the first fluid body; or allowing a volume of input fluid to be moved into the first fluid body.

In one embodiment of the fourth aspect, the volumes of fluid moved are such that the volume of fluid in each of the first and second fluid bodies is substantially unchanged.

In one embodiment of the fourth aspect, the step of dividing is achieved by disposing the first and second fluid bodies in the first and second chambers respectively of the apparatus of any embodiment of the first aspect.

DETAILED DESCRIPTION OF THE INVENTION AND PREFERRED EMBODIMENTS THEREOF

Figure 1:
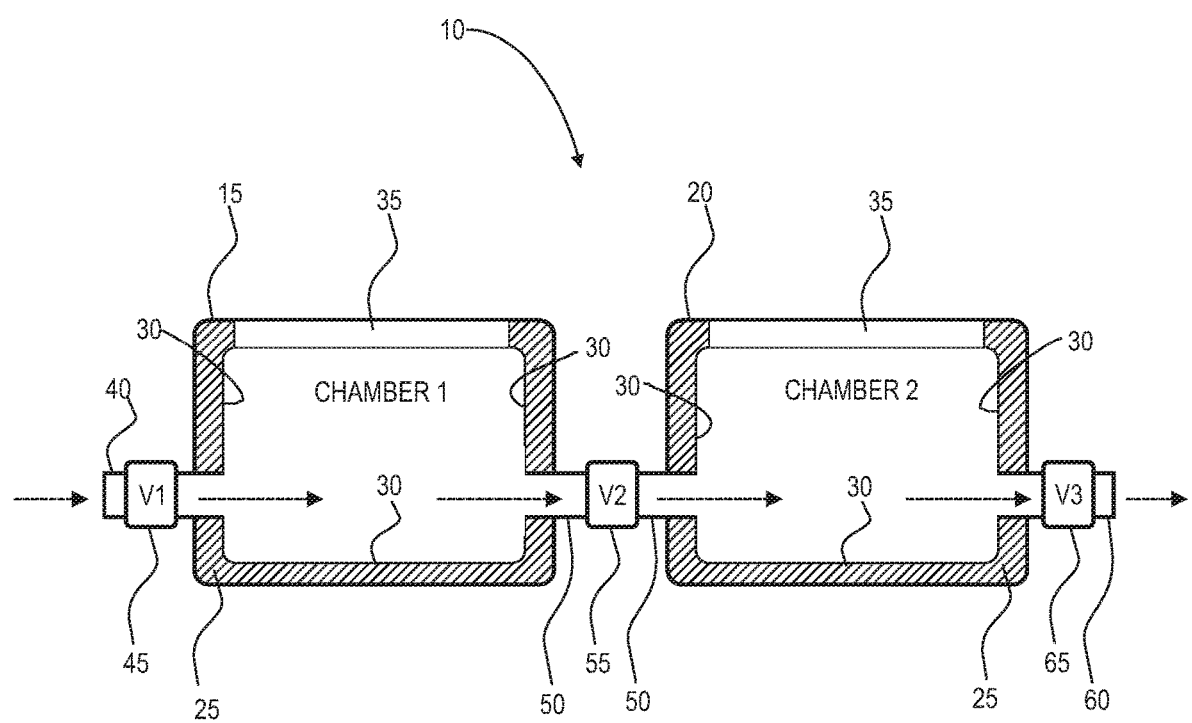
FIG. 1 illustrates highly diagrammatically, a cross-sectional lateral view of a non-limiting apparatus of the present invention. This apparatus comprises two chambers.

After considering this description it will be apparent to one skilled in the art how the invention is implemented in various alternative embodiments and alternative applications. However, although various embodiments of the present invention will be described herein, it is understood that these embodiments are presented by way of example only, and not limitation. As such, this description of various alternative embodiments should not be construed to limit the scope or breadth of the present invention. Furthermore, statements of advantages or other aspects apply to specific exemplary embodiments, and not necessarily to all embodiments covered by the claims.

Throughout the description and the claims of this specification the word "comprise" and variations of the word, such as "comprising" and "comprises" is not intended to exclude other additives, components, integers or steps.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may.

The present invention is predicated at least in part on the inventors' discovery that the temperature of a fluid heated by a solar collector may be increased by the use of multiple heating chambers within the collector. The increase in temperature is achievable without the need to increase the amount of solar radiation input into the collector. To be clear, the present inventor is not claiming that the solar collector described herein is necessarily more efficient in its use of solar radiation (although in some embodiments this may be the case). Instead, it is proposed that a given amount of solar radiation may be used to heat a fluid to a higher temperature than that otherwise possible for a similar collector that does not feature separate heating chambers of the type disclosed herein.

The present will be described firstly by reference to a simple two-chamber apparatus so as to facilitate understanding. These two chambers represent a subset of the larger number of chambers that might be required to obtain significant increase in temperatures in the fluid. Each of the chambers is configured, in some way, to transfer thermal energy from solar radiation incident thereon to a fluid present therein. For the purposes of this explanation, each of the chambers is a walled chamber with a portion of the wall being optically transparent. The optical transparency may be achieved by the use of a glass pane.

The non-transparent walls of the chamber are coated with a dark coloured material suitable for absorbing solar radiation.

The first chamber has an inlet allowing fluid to be heated to enter the chamber, and an outlet allow heated fluid to exit the chamber. The second chamber has an inlet allowing heated fluid from the first chamber to enter the second chamber, and also an outlet to allow heated fluid to exit the chamber for ultimate use.

In this context, the term "first chamber" is used to denote that chamber to which the input fluid is first contacted, and the term "second chamber" is used to denote that chamber to which the input fluid is second contacted.

Each of the chambers (or the apparatus as a whole) is configured so as to allow a fluid present therein to contact the dark coloured chamber walls and as a result of that contact be heated by the walls. As will be understood, the walls will themselves be heated by solar radiation passing through the transparent portion of the chamber and inciding on the dark coloured surfaces of the walls, with that heat energy being transferable to a contacting fluid.

Each of the chambers (or the apparatus as a whole) is configured to inhibit loss of heat gained in the walls and the fluid of the chambers to the environment. As for many prior art solar collectors, thermally insulating materials are used to prevent leaking of any captured solar energy to the environment.

The chambers (or the apparatus as a whole) are further configured to inhibit the transfer of heat between the first and second chambers. This may be achieved by the disposition of an insulating material between the chambers or by the physical separation of the chambers (in the latter case a conduit may carry fluid from the first to the second chamber). As will become clear from further discussion herein, the present invention operates to stratify heat throughout the apparatus (the second chamber holding fluid that is hotter than that held in the first chamber), with the inhibition of heat transfer between the chambers being required to maintain the stratification.

The chambers (or the apparatus as a whole) are configured such that fluid is capable of movement from the first chamber to the second chamber, but not from the second chamber to the first chamber. This is typically achieved by the use of a one-way valve (such as a check valve) in a fluid path between the two chambers. Other means of achieving one-way movement of fluid are contemplated. For example, a two-way valve may be used however the valve is opened (manually, automatically due to the pressure differential, or under processor control) only when the pressure of the fluid in the first chamber is greater than that in the second chamber such that fluid moves only from the first to the second chamber.

As indicated above, the fluid in the chambers may be at differential pressures. Accordingly, the first and second chambers (or the apparatus as a whole) may be configured so as to allow the fluid to be contained at an elevated pressure. The pressure may be elevated with reference to the pressure in the other chamber, or the pressure in the environment of a chamber, or the pressure in the environment of the apparatus, or atmospheric pressure. The pressure in the chamber concerned may be at least about 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 100% higher than the pressure in the reference. Alternatively, the pressure in the chamber concerned may be less than about 100%, 99%, 98%, 97%, 96%, 95%, 94%, 93%, 92%, 91%, 90%, 89%, 88%, 87%, 86%, 85%, 84%, 83%, 82%, 81%, 80%, 79%, 78%, 77%, 76%, 75%, 74%, 73%, 72%, 71%, 70%, 69%, 68%, 67%, 66%, 65%, 64%, 63%, 62%, 61%, 60%, 59%, 58%, 57%, 56%, 55%, 54%, 53%, 52%, 51%, 50%, 49%, 48%, 47%, 46%, 45%, 44%, 43%, 42%, 41%, 40%, 39%, 38%, 37%, 36%, 35%, 34%, 33%, 32%, 31%, 30%, 29%, 28%, 27%, 26%, 25%, 24%, 23%, 22%, 21%, 20%, 19%, 18%, 17%, 16%, 15%, 14%, 13%, 12%, 11%, 10%, 9%, 8%, 7%, 6%, 5%, 4%, 3%, 2%, or 1% lower than the pressure in the reference.

The ability to contain a fluid at pressure requires the chamber to be constructed so as to be substantially non-deformable under a predetermined pressure. Furthermore, the chamber should be constructed so as to be substantially fluid-tight under a predetermined pressure.

In order for the first chamber to maintain fluid at a pressure a one way valve on the input side may be required. In this way, fluid at an elevated pressure is unable to exit the chamber by the same rout as it entered. In some embodiment, the pressure of fluid from the fluid source on the chamber input is in itself high and therefore capable of preventing any backflow of fluid out of the first chamber, and accordingly a check valve may not be necessary. As a further alternative, the valve on the input side of the first chamber is two-way, but opens only when a relatively negative pressure in the first chamber is established.

As will become clear from further disclosure herein, fluid to be heated flows from the first chamber to the second chamber, but not in the reverse direction. This movement occurs after fluid in both chambers is heated to the same temperature, and then a volume of fluid from the second chamber is allowed to exit, with fluid from the first chamber entering the second chamber to replace the exited volume. Accordingly, a check valve may be placed on the output side of the chamber to allow only for exit of fluid from the second chamber. The exited fluid represents an output product (being heated fluid) and it would be undesirable for such fluid to re-enter the second chamber. In some embodiments, the pressure in the second chamber will always or sometimes be higher than the environment into which the fluid exits, and so the valve on the output side may allow flow in both directions, but because of the relatively high pressure in the second chamber the fluid exits in a single direction only. Where the pressure in the second chamber drops to a level that backflow becomes possible, the valve may be closed (manually, automatically or by processor). Of course, the valve on the exit side of the second chamber may be initially opened (manually, automatically or by processor) when the fluid pressure in the second chamber rises to a predetermined level so as to allow exit of a volume of fluid.

Reference is now made to FIG. 1 which shows a simple two-chamber embodiment of the present application broadly in line with the description above. The apparatus (10) of FIG. 1 comprises a first chamber (15) and a second chamber (20) each of the chambers (15) (20) being formed from a thick wall (25) having thermal insulating properties and also resistant to deformation to allow for the containment of fluid under pressure in the chambers (15) (20). Each of the chambers (15) (20) has an internal surface (30) that is dark in colour and therefore able to absorb solar radiation and to transfer the heat energy so generated to a fluid in contact with the internal surface (30).

Each of the chambers (15) (20) has a transparent portion which in this example is a glass pane (35). The glass pane (35) allows for the entry of solar radiation into each chamber (15) (20), and also to incide on the inner surfaces (30) thereof. Given the general requirement for fluid tightness and pressure tightness the glass pane (35) is sealingly secured to the adjoining wall (25) of the chamber (15) (30). The glass pane (35) may be mechanically secured (by a slot or bracket for example, not shown) and a suitable curable liquid sealant (not shown) applied at any interfaces between the wall (30) and glass pane (35).

The path of fluid through the apparatus (10) is indicated by the dashed arrows. Each chamber therefore has an input side on the left (as drawn) and an output side on the right (as drawn).

The first chamber (15) has a conduit (40) on the input side which carries input fluid to be heated into the chamber (15). In this embodiment, the input fluid is provided under a low pressure by a pump (not shown). The valve V1 (45) acts to regulate the flow of input fluid through the conduit (40). In this embodiment, the valve V1 (45) is a simple check valve that opens automatically when the pressure of fluid in the first chamber (15) drops below the pressure upstream in the conduit (40).

The first chamber has another conduit (50) on the output side, the conduit (50) also functioning as an input conduit for the second chamber (20). Put another way, the conduit (50) may be considered a joining conduit functioning to fluidly connect the first chamber (15) to the second chamber (20).

The conduit (50) has a valve V2 (55) controlling the flow of fluid between the first (15) and second (20) chambers. The function of this valve is to restrict the flow of fluid only from the first (15) to the second (20) chamber and to prevent backflow. In this embodiment, the valve V2 (55) is controlled by a computer processor (not shown). For reasons explained further infra, the judicious timing of valve V2 (55) opening and closing is important to the efficient operation of the apparatus (10).

The second chamber (20) is essentially identical in structure, dimensions and function to the first chamber (15). In this way, the chambers (15) (20) are equally capable of absorbing solar radiation and transferring heat energy to fluid contained therewithin.

The second chamber (20) has a conduit (60) on the output side through which heated fluid (being the end product of the apparatus (10)) exits. Movement of fluid from the second chamber (20) to the output conduit (60) is controlled by valve V3 (65). In this embodiment, valve V3 (65) is controlled by the same processor controlling valve V2 (55) allowing for the coordinated opening and closing of valves V2 (55) and V3 (65) to effect correct operation of the apparatus (10).

Figure 2:
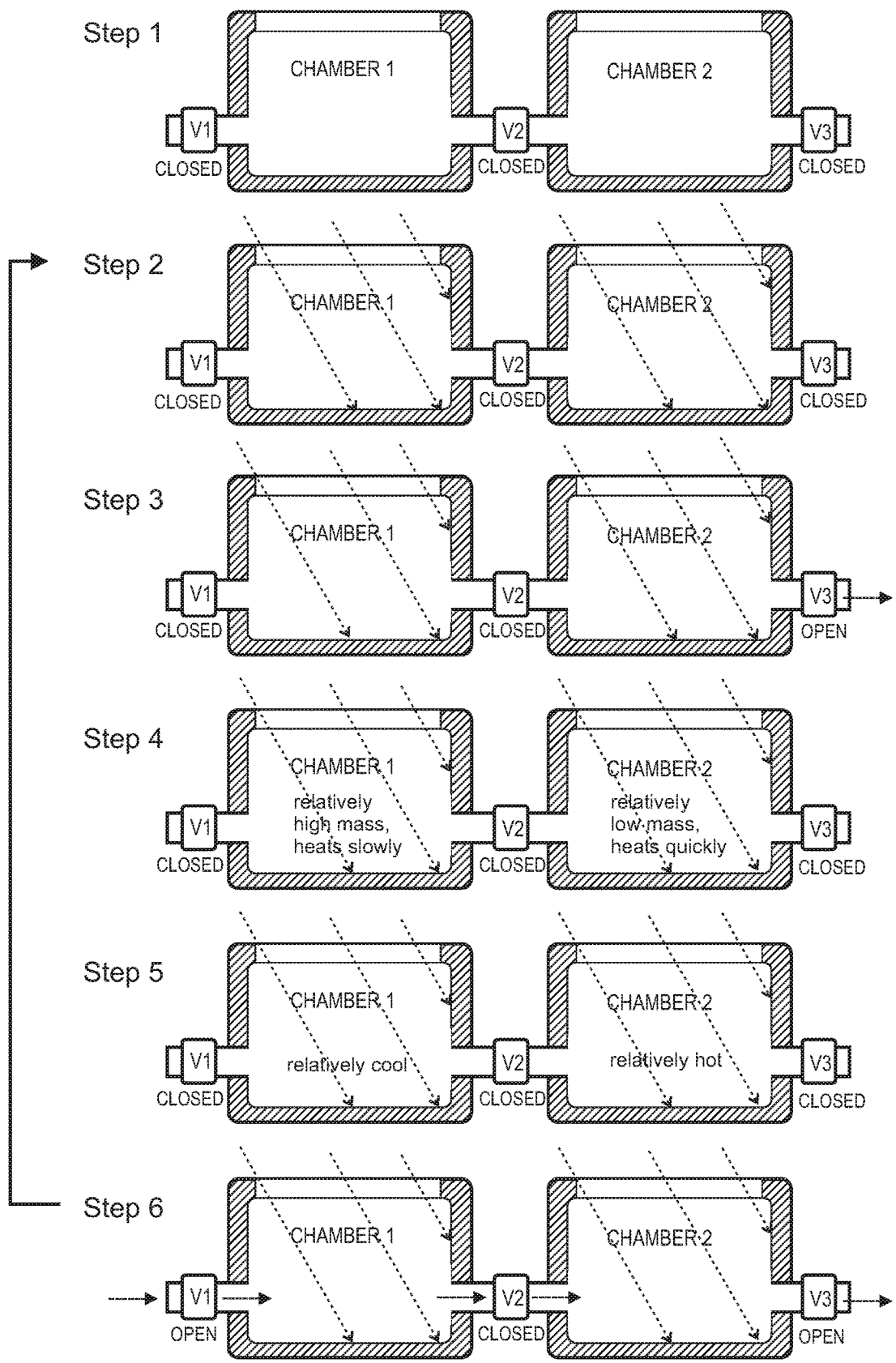
FIG. 2 illustrates a non-limiting set of methods steps for the operation of the embodiment of FIG. 1 to produce a heated fluid from incoming solar radiation.

With the assistance of FIG. 2, operation of the embodiment of FIG. 1 is now provided. In all process steps shown in FIG. 2, each of the first and second chambers are maintained filled with fluid, with removal of fluid via an output side of chamber being replaced by fluid flowing into the chamber via the input side.

Reference is made to the first step of FIG. 2 showing both chambers having been previously filled with fluid. The chambers were filled by pushing fluid via V1 into chamber 1, and then further into chamber 2 via V2. To allow for escape of air during filling V3 was left open. When both chambers were filled, V1, V2 and V3 were closed. This is the state of the apparatus shown at Step 1, with all valves being closed, and both chambers filled.

At Step 2 of FIG. 2, both chambers are oriented toward the sun such that solar radiation (indicated by the diagonal dashed arrows) passes through the glass plane and incides onto the internal dark coloured surface of both chambers. The fluid in both chambers heats at the same rate, given that the chambers are essentially identical. All valves remain closed.

At Step 3 of FIG. 2, V3 is opened momentarily to allow exit of heated fluid from chamber 2. Because chamber 2 has been essentially sealed during the heating process, the pressure of fluid is increased and accordingly, when V3 is opened the fluid naturally moves outwardly via V3. The fluid exiting chamber 2 at this step is the same temperature as that in chamber 1 and is released not because it is especially hot, but instead to reduce the mass of fluid in the second chamber, thereby commencing the generation of fluid that is hotter than that in chamber 1.

At Step 4 of FIG. 2 all valves are closed and both chambers continue to be exposed to solar radiation, thereby heating fluid in both chambers. At this step there is a stratification of mass across the apparatus in that the number of fluid molecules in chamber 2 is now lower than the number of molecules in chamber 1. The reason for this differential in mass is because some fluid molecules exited from chamber 2 when V3 was momentarily opened, however chamber 1 remained sealed (V1 and V2 remained closed) and the number of fluid molecules in chamber 1 remained unchanged.

Without wishing to be constrained by theory in any way, it is proposed that in the state shown in Step 4, fluid in chamber 2 increases in temperature (due to the incoming solar radiation) at a faster rate than the fluid in chamber 1. The reason proposed is that both chambers receive the same amount of incoming solar radiation, however for chamber 2 that amount of radiation acts to heat a relatively small number of fluid molecules while the same amount of radiation for chamber 1 acts to heat a relatively large number of fluid molecules. It will be recalled that the differential in mass (i.e. number of fluid particles) between the chambers is due to the removal of fluid form chamber 2 but not from chamber 1.

After a set period of time, a stratification of temperature across the apparatus results, as shown at Step 5 of FIG. 2. Because the fluid in chamber 2 has been heating relatively quickly, the fluid in chamber 2 is relatively hot. Because the fluid in chamber 1 has been heating relatively slowly, the fluid in chamber 1 is relatively cool.

While this stratification of temperature is in place, V3 is opened such that relatively hot fluid (the fluid being hotter than that exiting chamber 2 at step 3, and also hotter than the fluid in chamber 1 at any step) exits the second chamber as a final product of the apparatus. The opening of V3 is shown at Step 6 of FIG. 2. At this step, V1 is also opened so as to allow (i) movement of fluid from chamber 1 into chamber 2, and (ii) movement of fluid from the fluid source into chamber 1. Once chamber 2 is exhausted, V2 is opened (not shown) to allow movement of incoming fluid from chamber 1 into chamber 2. These movements of fluid via V1 and V2 cause the fluid bodies in chamber 1 and chamber 2 to cool. It will be appreciated that only a proportion of all fluid in each chamber is moved for any given valve opening.

The process detailed in FIG. 2 continues in a cyclic manner, with the step following Step 6, being Step 2.

As will be noted, for each cycle there is a hot (but not especially hot) volume of fluid exiting the apparatus at Step 3, and a second volume of especially hot fluid exiting at Step 6. These two volumes may be mixed to provide a fluid of intermediate temperature. Alternatively, the two volumes may be maintained separate so as to preserve the especially elevated temperature of the volume exiting at Step 6. In some embodiments, the fluid exiting at Step 3 may be returned to the fluid source so as to preheat the input fluid.

Figure 3:
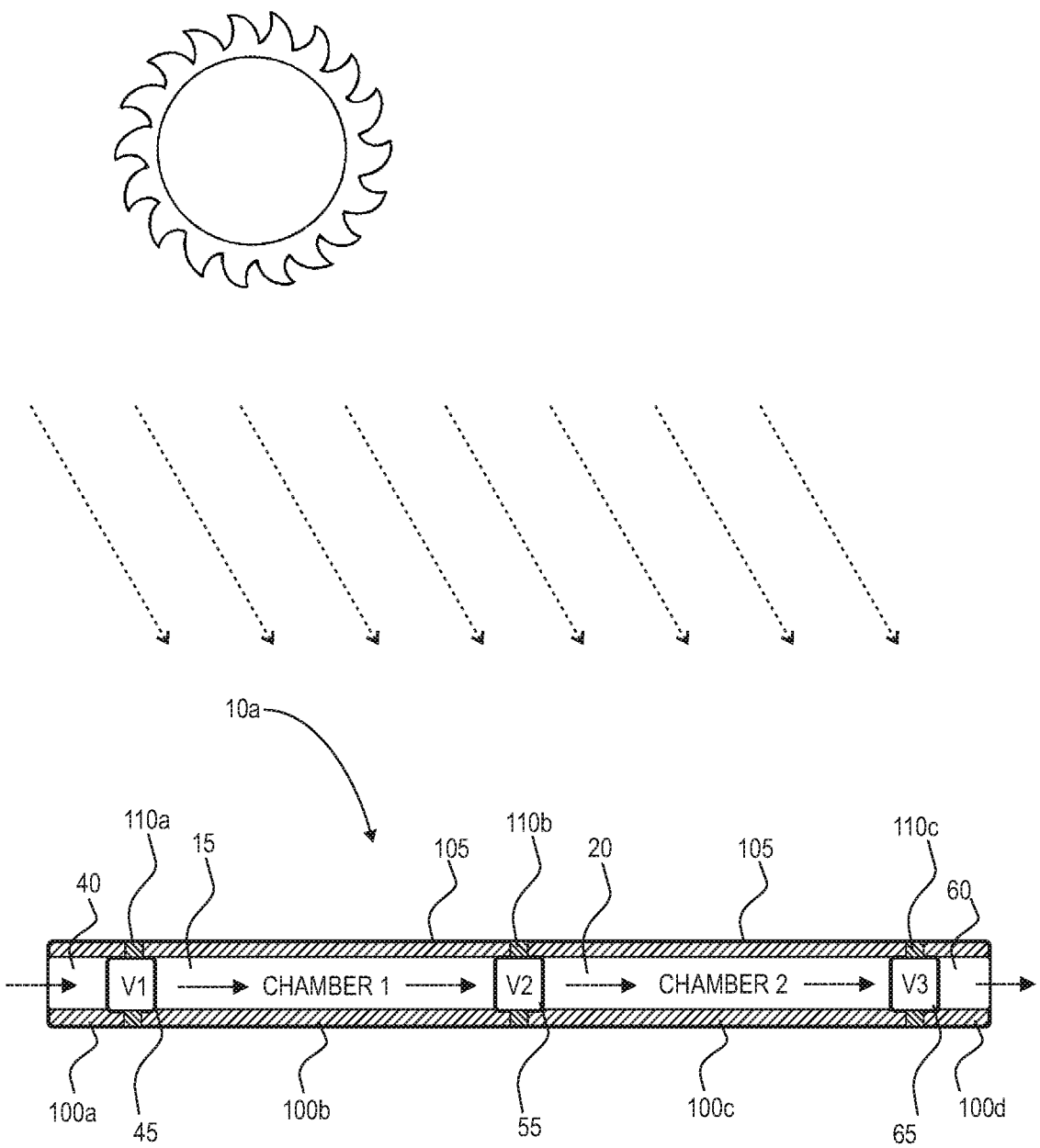
FIG. 3 illustrates highly diagrammatically, a cross-sectional lateral view of an alternative non-limiting apparatus of the present invention. This form of the invention may be used as an absorber tube in a conventional parabolic trough collector. This apparatus comprises two chambers.

FIG. 3 shows a variation on the solar collection apparatus of FIG. 1. In FIG. 3, the apparatus (10a) is a simple tubular solar collector formed from a series of metal tubes (100a) (100b) (100c) (100d), each tube having thermally conductive wall (105) and an external surface (105) which is dark coloured. The external surface (105) is functionally equivalent to the surface (30) in the embodiment of FIG. 1. Solar radiation incides on the surface (105) thereby heating the wall of the metal tubes (100b) (100c) so as to heat fluid within the first chamber (15) and the second chamber (20). To thermally insulate the first chamber (15) from the second chamber (20) an annular ring (110b) fabricated from an insulating material is disposed therebetween. Insulating annular rings (110a) and (110c) are also disposed between the input side of first chamber (20) and input conduit (40), and also between the output side of the second chamber (20) and output conduit (60) to assist in preventing heat loss from fluid in the chambers (15) (20).

The variation of FIG. 3 may be used as an absorber tube in the context of a parabolic reflector, whereby the absorber tube is disposed along the focal line of the reflector. By contrast, the embodiment of FIG. 3 will be better suited to mounting on a roof top or other planar surface.

Figure 4:
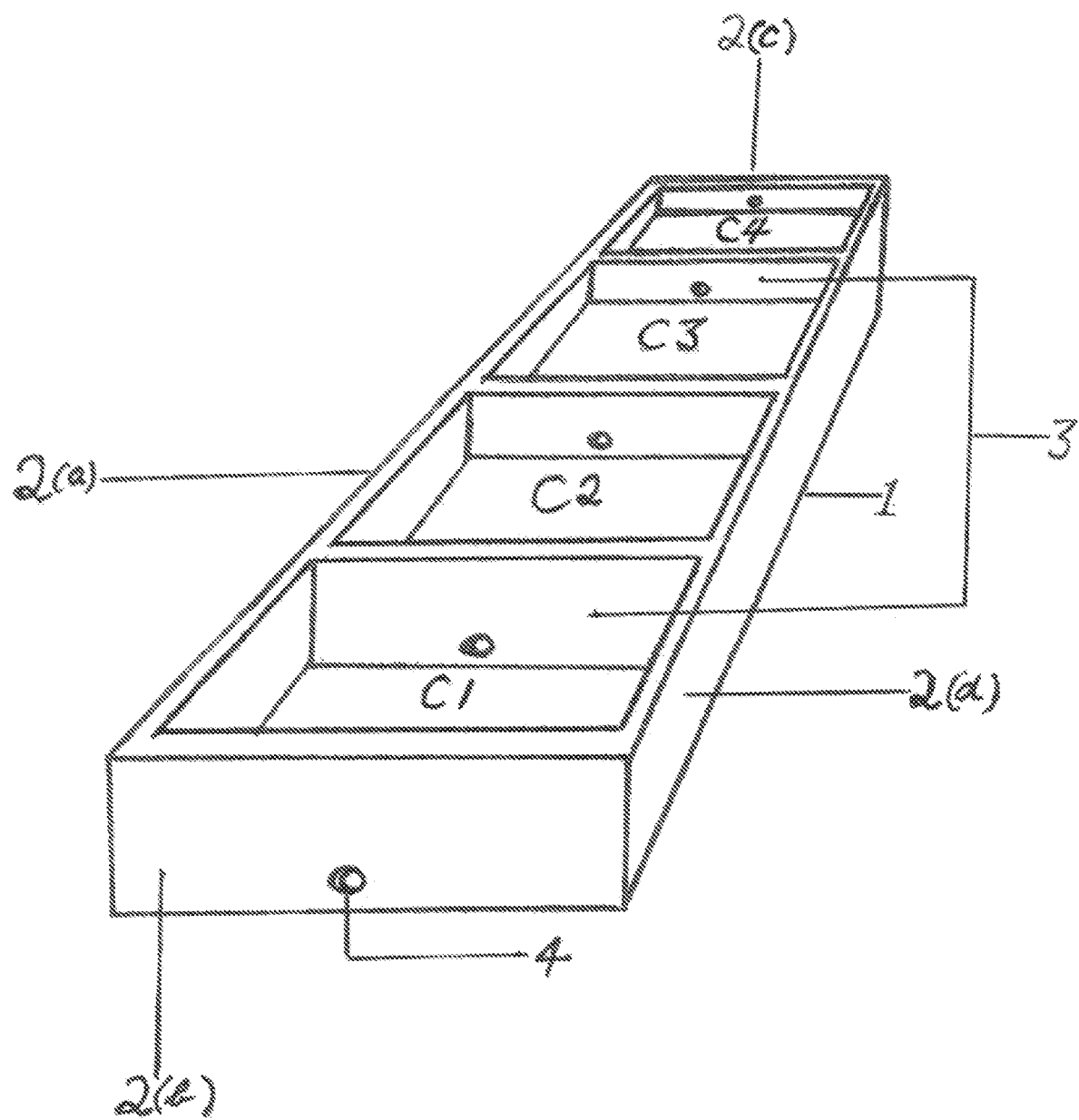
FIG. 4 illustrates highly diagrammatically, a perspective view of a non-limiting apparatus of the present invention having four compartments. Each of the compartments is functionally equivalent to a chamber of the embodiments drawn in FIG. 1. In the associated description, the compartment in the foreground (as drawn) is referred to as "proximal" or "front" and the compartment in the background (as drawn) is referred to as "distal" or "back".

Reference is now made to FIG. 4 and onwards which disclose further, more particular, but non-limiting embodiments of the invention. Any feature disclosed with respect to the following embodiments and methods of operation may be independently applied to the more generic embodiments and methods disclosed supra in relation to FIGS. 1 through 3. Moreover, any combination of two or more features disclosed with respect to the following embodiments and methods of operation may be independently applied to the embodiments and methods disclosed supra in relation to FIGS. 1 through 3.

The apparatus of FIG. 4 consists of two or more compartments and may in theory utilise many compartments for example one hundred. The compartments may be of any shape and any size, for example, the combined compartments may form a linear structure that may be rectangular in two dimensions with a more shallow third dimension or the combined compartments may be round and in the shape of a cake and the individual compartments may, in this example, be compared to the slices of a cake.

For the sake of easy description, a rectangular shaped structure having four compartments is detailed. The compartments are connected to one another and are in this description of equal size. Each compartment is a solar collector, with the series of solar collectors forming the apparatus.

Each solar collector consists of an absorber and is covered by a sheet of material that is translucent to solar radiation. The absorber is made of a material or coated by a material that is dull matte black in colour and the absorber is capable of absorbing most of the solar radiation that incides the absorber, for example black iron, copper with an oxidised surface that is painted black or surfaces that are painted black. The sheet of translucent material may, for example, be a suitable type of glass or it may be sapphire glass or it may be a translucent mica.

In the description that follows the apparatus is conveniently described as being a rectangular box that has a length four times its width and its internal depth is a third of its width. The box has three partitions so that four equal compartments are created. In FIG. 4 these compartments are labelled C1, C2, C3 and C4. The floor of each compartment is occupied by an absorber that extends at least most of the way up each wall of its compartment (see FIG. 6). Surrounding each absorber is a heat insulator of a good thickness that comprises the floor, the sides and the partitions of the box (see FIG. 4), but the roof of each compartment of the box consists of two glass panes of almost square shape and their frame, the glass panes being affixed at their edges to the frame, this affixture forming both a secure attachment and a high-quality seal of glass pane to frame. In a particular design only, as illustrated in this description, the portion of the frame that attaches to a partition is capable of holding the glass panes of an adjacent compartment (see FIG. 6). The frame is also capable of being firmly attached to the upper surfaces of the sides and partitions of the rectangular box, so that the frame and its glass panes, in combination with the frames and glass panes of the other compartments, form the upper wall completing the rectangular box. It is desirable that the frames have good heat insulating properties.

FIG. 4 is a drawing of a rectangular box that has three partitions and four compartments. The compartments are labelled C1, C2, C3 and C4. In order to facilitate the description of the apparatus the box is described and defined as having (as drawn) a front, a back, two sides, a top or roof and a floor or bottom. These words front, back, sides, top or roof and floor or bottom therefore have a special meaning, by definition, in the description of this invention. In FIG. 4 the top or roof is not shown and is lacking. Therefore, in FIG. 4 no roof is drawn.

The label numbers refer to:—
(1) a box lacking its top or roof
(2a) one side of the box
(2b) the front of the box
(2c) the back of the box
(2d) another side of the box
(3) a partition in the box
(4) a portal in the box
Each compartment has its own portal.

The box is made of a high heat insulating resistant material, that also is non-flammable and has a high melting point.

Figure 5:
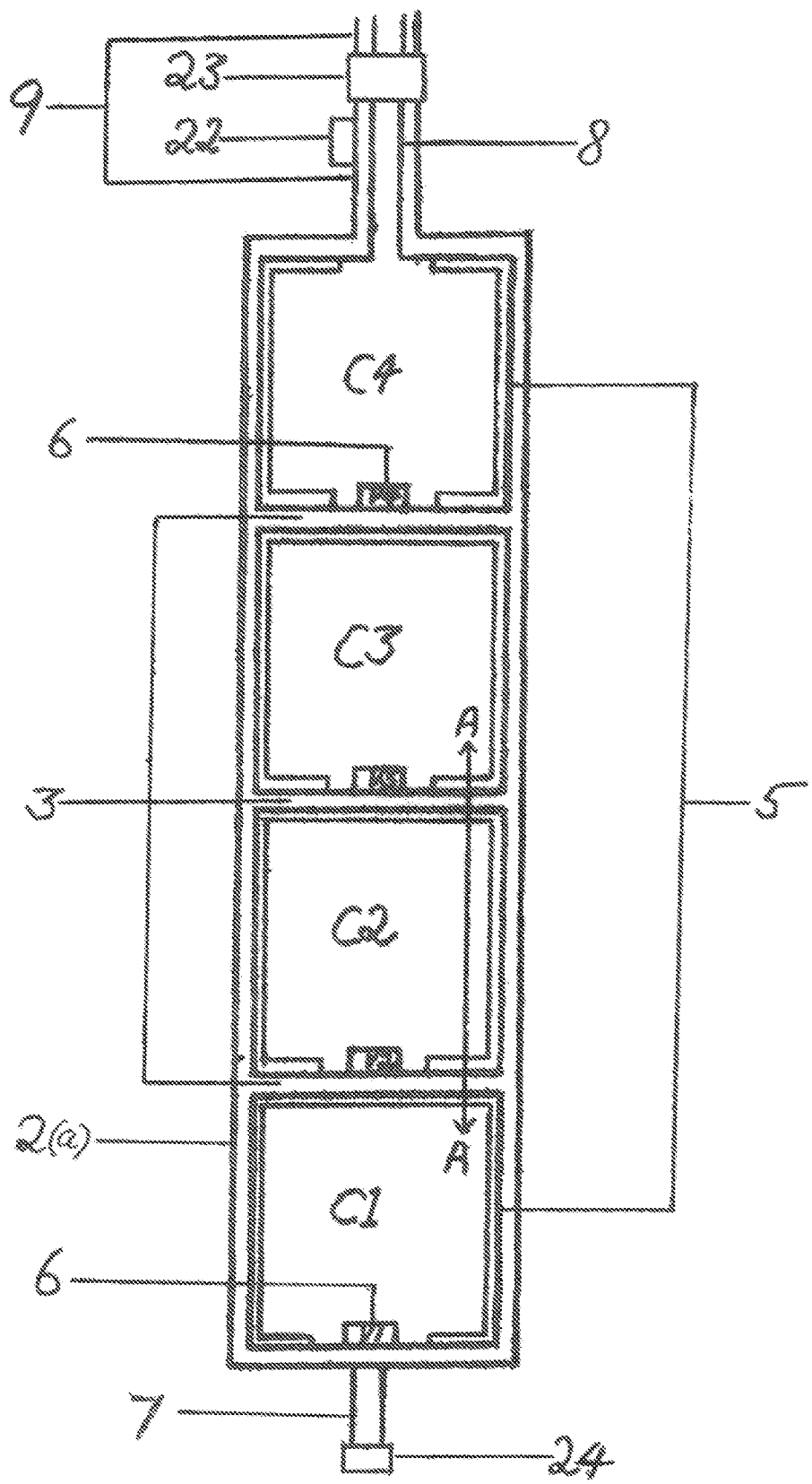
FIG. 5 illustrates highly diagrammatically, a plan view of the non-limiting apparatus drawn in FIG. 4.
Figure 6:
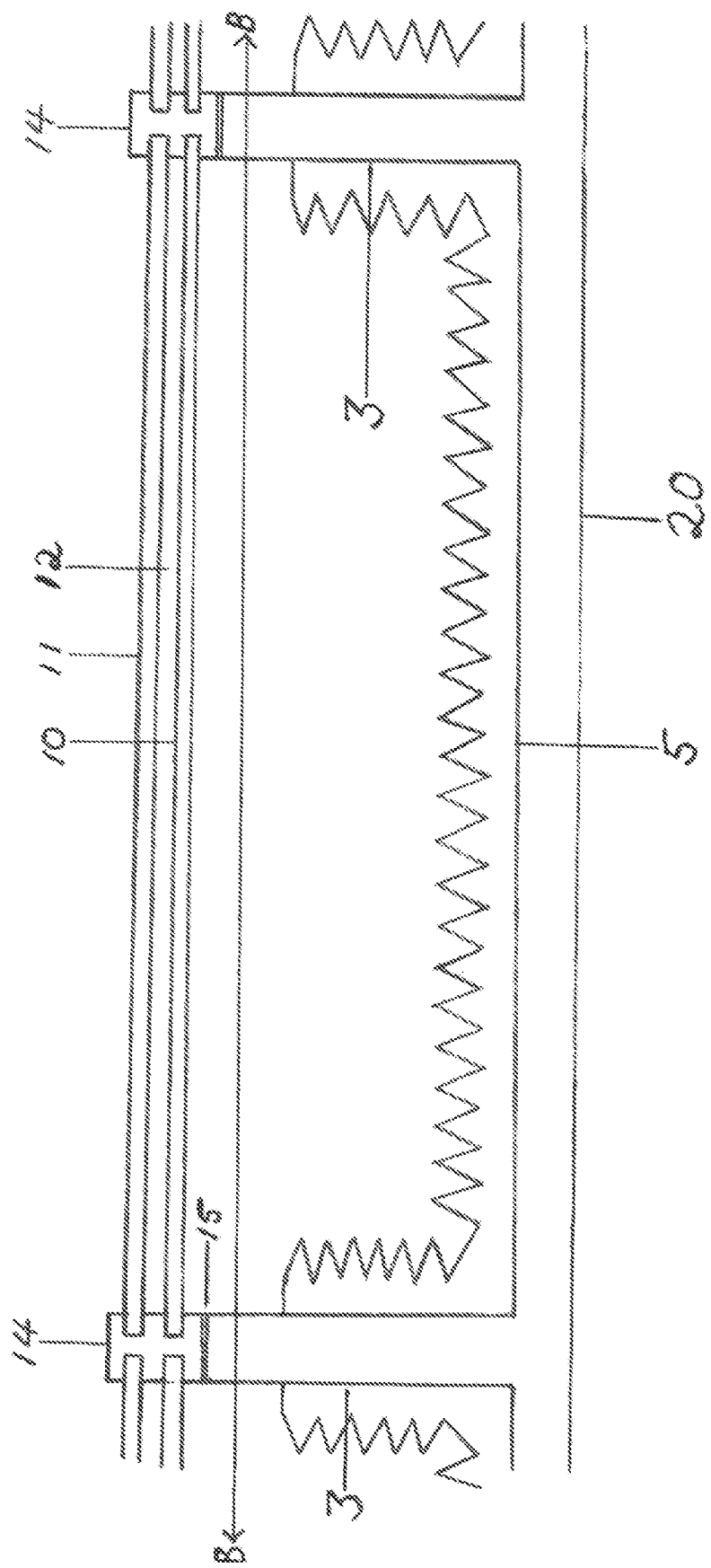
FIG. 6 illustrates highly diagrammatically, a cross-sectional lateral view of a compartment of the apparatus drawn in FIG. 4 showing the use of two glass panes and convolutions in the inner compartment wall and floor.

FIG. 5 shows a view looking down on the apparatus, through a section at level B-B as shown in FIG. 6. It shows the box with its four compartments labelled C1, C2, C3 and C4.

Figure 5A:
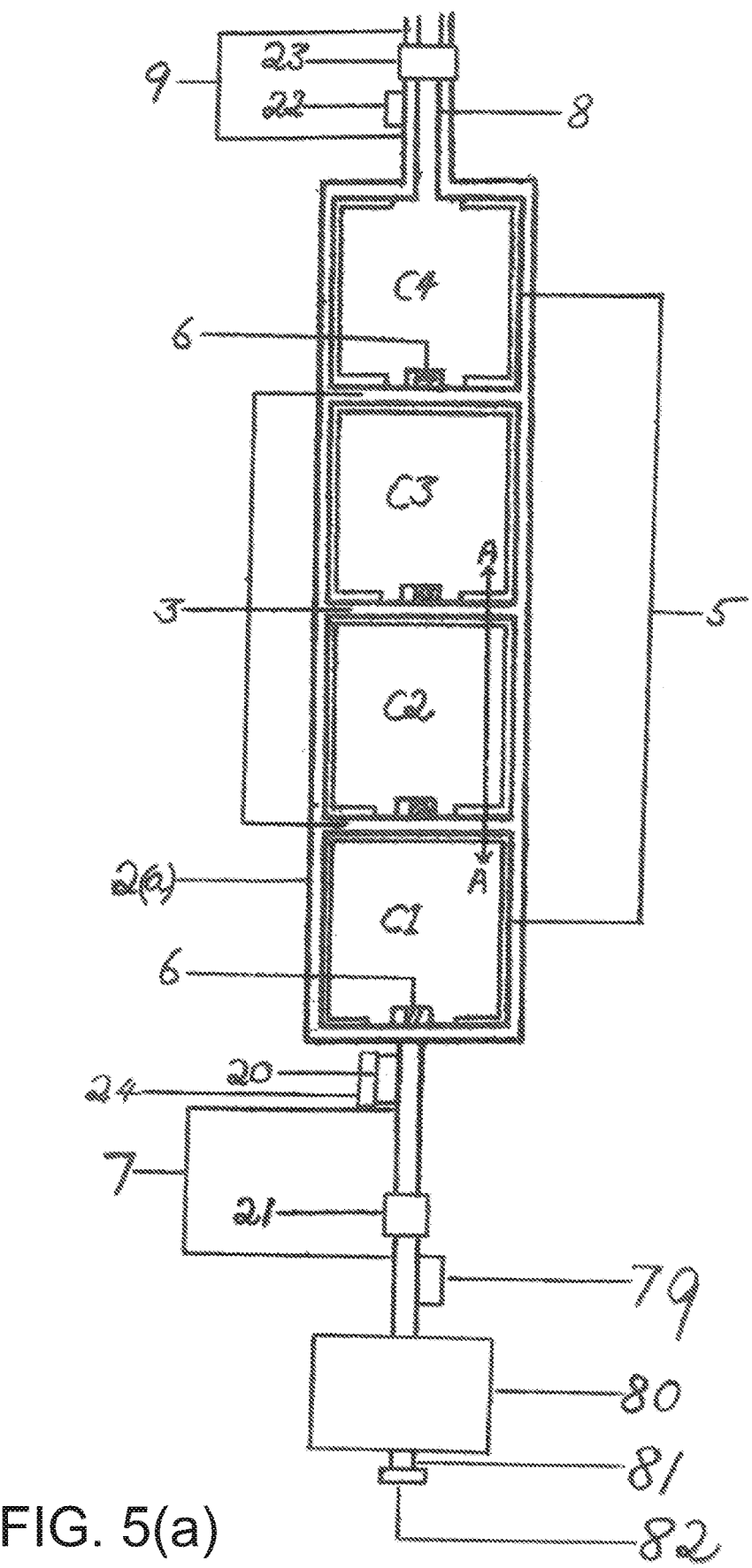
FIG. 5(a) illustrates highly diagrammatically, a plan view of a system comprising the non-limiting apparatus as drawn in FIG. 4, in combination with a pump connected to the input side of the first (proximal) chamber.

The label numbers refer to:—
(2a) a side of the heat resistant box
(3) a partition
(5) an absorber
(6) a pressure valve
(7) a pipe
(8) the apparatus end of an outlet pipe
(9) high heat insulating casing surrounding the outlet pipe
(22) a venting valve
(23) a gating type valve
(24) an air inlet filter FIG. 5a is identical to FIG. 5 save for that portion of the apparatus external to the rectangular box and in front of the front of the rectangular box (as defined) of the apparatus. The labelling is the same as in FIG. 5 but there are shown additional features. The air inlet filter (24) is shown in a different position and attaches to an air intake valve (20) that opens to the pipe (7).

The label numbers of the extra features refer to:—
(20) a gating type valve that, when open, allows the intake air from the atmosphere
(21) a gating type valve
(24) an air inlet filter that is also shown in FIG. 2
(79) a gating type valve
(80) a pump
(81) the pump's air intake port
(82) an air inlet filter In FIG. 5(a) the pipe (7) connects to a pump (80). A valve (20) is placed between the pipe (7) and an air filter (24). In ordinary operation the valve (20) is fully open and allows free air intake from the atmosphere into the apparatus. The air filter (24) lies not at the end of pipe (7) but to its side and separated from it by the valve (20).

FIG. 6 shows a lateral view of the apparatus through a section labelled A-A in FIG. 5 and FIG. 5(a).

Figure 7:
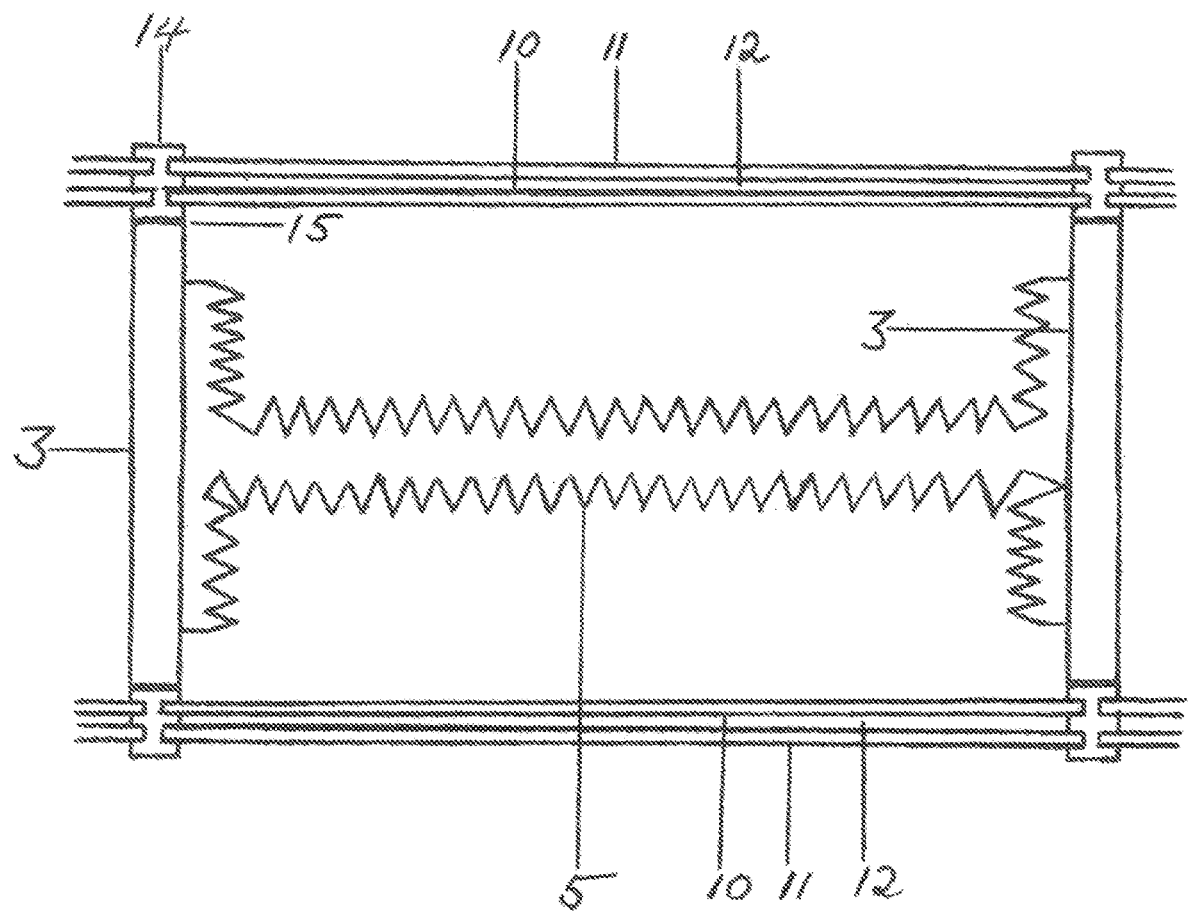
FIG. 7 illustrates highly diagrammatically a cross-sectional lateral view of a compartment having opposed glass panes and opposed convoluted walls and floors. This embodiment is capable of receiving solar radiation from two sides of the apparatus.

The label numbers refer to:—
(3) a partition
(5) an absorber, showing its surface, extending at least most of the way up the walls of the partitions of chamber C2, and also its surface that consists of high hillocks and in a two-dimensional view, that FIG. 6 provides only, can be described as sawtooth.
(10) a second glass plate or second sheet of glass
(11) a first glass plate or first sheet of glass
(12) a vacuum
(14) frame of the glass plates
(15) a junction
(40) a portion of the floor of the heat resistant box FIG. 7 shows a lateral view of the apparatus through a section labelled A-A in FIG. 5. This is described later in the body of the text of the apparatus as a variation. It is identical to FIG. 6 save that the absorber is capable of absorbing from two sides of the rectangular box, both top and bottom (as defined). To enable this the bottom of the apparatus (as defined) has two sheets of glass separated by a vacuum in identical fashion to that of the top (as defined). A space separates the absorber from the bottom sheets of glass and a portion of the floor of the box made of a heat resistant material does not exist. The bottom half is in fact a mirror image of its top half from the level of the bottom of the absorber, save for the fact that the hillocks of the absorber's surface do not coincide with its upper surface, but rather rise from in between the hillocks of the upper surface of the absorber. This is so to provide a balanced thickness to the absorber, so facilitating the absorber's ability to both absorb solar energy and re-radiate heat energy. Its labelling is identical to that of FIG. 6 (the bottom of the absorber is that lower surface of the absorber that is in contact with the bottom of the heat resistant casing of the rectangular box).

In relation to any embodiment, the apparatus may be a solar energy collector. The collector may use as a medium a gas for example air or nitrogen or argon or carbon dioxide. The apparatus may be adapted to use a liquid, such as, but not limited, to water. If the apparatus were to use water an end-product may be steam and the apparatus would need to be modified. For instance, its outlet pipe would need to be near or at the top (as defined) of the apparatus in order to allow the steam to escape to perform useful work. If the end product is not steam, with further heating, such as may occur with the addition of further chambers, super steam might be produced. This assumes a robustness of the apparatus to withstand the pressures involved.

The apparatus may be small, for example, suitable for household use or it may be large, for example, the size of a football field and in use on an industrial scale. The apparatus may take on many shapes, for example, round or square or irregular.

In the description that follows the method of operation for a simple example is discussed, being an apparatus that is a rectangular box, made of heat insulated material with a double glass top and the medium that the inventor has chosen is air. Each compartment in this description is herein later referred to variably as a chamber or as a compartment, the terms being interchangeable at least in so far as the function of each is concerned.

The apparatus, in the body of this invention, operates largely in a passive way, but there is some variation to this, as described infra in some detail. Each chamber has its own valve. Each valve only allows the flow of air from the front of the apparatus to the back of the apparatus and does not allow air to flow in the opposite direction i.e. after air enters the apparatus it can only flow from chamber 1 to chamber 2 to chamber 3 to chamber 4 and only exit the apparatus via its outlet pipe. In the description of operation that follows these chambers are referred to as C1, C2, C3 and C4 respectively. The valves of each chamber are referred to as V1, V2, V3 and V4 respectively.

Description of Operation

With regard to this embodiment the word "proximal" means nearer the fluid source (nearer the front of the apparatus, as drawn) and the word "distal" means further away from the fluid source (nearer the back of the apparatus, as drawn).

The valves V1, V2, V3 and V4 are pressure sensitive valves. The valves open and close in response to pressure. The valves are of the type that when the pressure of a chamber equals the pressure in its more proximal adjacent chamber the valve loosens and when the pressure falls further below its more proximal adjacent chamber the valve opens and with further fall in pressure the valve opens widely. When the pressure in the chamber rises and equals the pressure in its more proximal adjacent chamber the valve closes. With further rise in pressure the valve remains closed. This applies to the valves V2, V3 and V4. In the case of valve V1 the valve loosens when the pressure in chamber C1 becomes equal to atmospheric pressure and with further fall in pressure the valve V1 opens and with further fall in pressure opens widely.

The following discussion provides an explanation for the progressive increase in temperature of the heated air in the chambers moving from proximal to distal through the apparatus.

In this description and throughout this document the terms "in operation" and "in use" mean that the compartments or chambers of the apparatus are receiving an even and adequate solar insolation to produce a supply of heated air of a quality that can produce useful work and the apparatus as a whole is functioning in its normal working capacity.

It is more readily comprehended why the temperature increases in each chamber from the front of the apparatus to the end of the apparatus if one starts at the most distal compartment C4 and works proximally.

The gating type valve (23) is computer controlled. In operation (as defined) chamber C4 is the hottest of the chambers. When the criteria for the release of some of the contents of chamber C4 is reached the computer opens valve (23) and a portion of its contents, that is heated air, is released through the valve from chamber C4 to produce useful work. The computer has sensors in each chamber of the apparatus that sense both temperature and pressure and also sensors that sense both temperature and pressure of the atmosphere. The computer computes a suitable amount of heated air to be released. This release of air causes a fall in pressure in chamber C4. When the fall in pressure in chamber C4 falls below the pressure in chamber C3 the valve V4 is open and allows air to flow from chamber C3 into chamber C4 until the pressure in both chambers equalises. At this point the valve V4 closes (but see timing of the opening and closing of the internal valves below). This flow of air from chamber C3 causes the pressure in chamber C3 to fall. When the pressure in chamber C3 falls below the pressure in chamber C2 the valve V3 is open and allows air to flow from chamber C2 into chamber C3 until the pressure in both chambers equalises.

At this point the valve V3 closes (but see timing of the opening and closing of the internal valves below). This flow of air from chamber C2 causes the pressure in chamber C2 to fall. When the pressure in chamber C2 falls below the pressure in chamber C1 the valve V2 is open and allows air to flow from chamber C1 into chamber C2 until the pressure in both chambers equalises.

At this point the valve V2 closes (but see timing of the opening and closing of the internal valves below). This flow of air from chamber C1 causes the pressure in chamber C1 to fall. When the pressure in chamber C1 falls to the pressure of the atmosphere the valve V1 loosens and as the pressure in chamber C1 tends to fall below atmospheric pressure the valve V1 opens and air flows freely from the atmosphere through the air filter (24) and pipe (7) into chamber C1.

It is important to understand both the sequence and timing of the opening and closing of the internal valves within the apparatus. The valve V4 opens as described above and closes when the pressure in C3 and C4 are equal, but the valve V3 has already opened before the closure of valve V4 and the flow of air from C2 into C3 mitigates the fall in pressure in C3. This opening of valve V3 occurs late in the period of opening and closing of valve V4 so that the contribution of heated air that passes from C3 into C4 is mostly that portion of air that existed in C3 before the opening of valve V4 (rather than the mixture of air that commenced as a result of the opening of valve V3).

The valve V3 opens as described above and closes when the pressure in C2 and C3 are equal, but the valve V2 has already opened before the closure of valve V3 and the flow of air from C1 into C2 mitigates the fall in pressure in C2. This opening of valve V2 occurs late in the period of opening and closing of valve V3 so that the contribution of heated air that passes from C2 into C3 is mostly that portion of air that existed in C2 before the opening of valve V3 (rather than the mixture of air that commenced as a result of the opening of valve V2).

The valve V2 opens as described above and closes when the pressure in C1 and C2 are equal, but the valve V1 has already opened before the closure of valve V2 and the flow of air from the atmosphere into C1 mitigates the fall in pressure in C1. This opening of valve V1 occurs late in the period of opening and closing of valve V2 so that the contribution of heated air that passes from C1 into C2 is mostly that portion of air that existed in C1 before the opening of valve V2 (rather than the mixture of air that commenced as a result of the opening of valve V1).

In operation (as defined) a single cycle of the apparatus is herein defined as that sequence of events that occurs from the initiation of loss of pressure in chamber C4, as a result of opening of valve (23), by computer direction, and the closure of valve V1, after its opening, as a result of the pressure in chamber C1 equaling that of the atmospheric pressure. At the completion of a single cycle of the apparatus there follows a period with all the internal valves of the apparatus and the gating valve, valve 23 being closed [in operation valve 22 remains shut] and all the chambers of the apparatus continue to receive the continuing and unbroken heating of the chambers of the apparatus as a result of solar radiation passing through the glass panes of the apparatus and inciding on the absorber of each chamber of the apparatus to be converted to heat radiation, the heat radiation being passed to the air within a chamber of the apparatus and heating the air within that chamber, such amount of heat energy that is being continually acquired by each of the chambers of the apparatus being acquired in equal amounts, under any given conditions of the atmosphere. The continual, though varying, acquisition of heat energy by each of the chambers of the apparatus being of equal amount in each of the chambers of the apparatus, has been discussed elsewhere in this document, and is considered to be a very reasonable assumption, each of the chambers being of equal dimensions. At the completion of this period the next cycle of the apparatus commences with the fall of pressure in chamber C4.

Therefore, at the end of a single cycle of the apparatus (as defined) in operation (as defined) the chamber C4 has benefited from a contribution of heated air that is mostly the original contents of chamber C3, but may contain a portion of mixed air from chamber C3 and chamber C2. The chamber C3 has benefited from a contribution of heated air that is mostly the original contents of chamber C2, but may contain a portion of mixed air from chamber C2 and chamber C1. The chamber C2 has benefited from a contribution of heated air that is mostly the original contents of chamber C1, but may contain a portion of mixed air from chamber C1 and the atmosphere.

At the end of this single cycle this contribution of heated air from a proximal chamber to its immediate next distal chamber confers an advantage to the recipient chamber in the form of heat energy and results in a progressive rise in temperature in each chamber moving from proximal to distal through the apparatus.

In the period and before the commencement of the next cycle of the apparatus (as defined), as a result of solar radiation being received in all chambers evenly and being converted to heat radiation, the air in all chambers continues to receive heat and be heated. But a chamber with a higher temperature has a slightly greater velocity of temperature rise than a cooler chamber. Therefore, a chamber with a higher temperature has a slightly greater velocity of pressure rise than a cooler chamber. This pressure rise ensures the secure closure of the valves between chamber and chamber.

In operation the apparatus continues to cycle, each proximal chamber contributing heat in the form of heated air to its next immediate distal chamber and as a result of this contribution each next immediate distal chamber is hotter than its next immediate proximal chamber.

It is important to realise that the computer should not direct valve (23) to take too greater proportion of heated air from chamber C4, otherwise it is possible for a result that has all the internal valves i.e. V1, V2, V3 and V4 of the apparatus open at the same time. This can occur, albeit only very briefly (briefly only, due to ongoing heating of the apparatus) at the very end of a single cycle (as defined). This is undesirable as it creates a brief "flow-through situation" and is to be avoided. The computer is preferably programmed to avoid that situation, or to at least ensure that minimal flow through results.

In one variation the internal valves of the apparatus may be gating type valves and all the valves of the apparatus both internal and external are computer controlled. This is further briefly discussed. The computer as a result of its computation is able to optimise the transfer of maximum heated air from a proximal chamber to its next immediate distal chamber so that virtually all of the heated air contribution from a proximal chamber is passed on to its next immediate distal chamber, by for example only, slightly varying the opening and closing of the internal valves of the apparatus. This may have some benefit in the efficiency of the apparatus.

As a result of heating of the chamber C4, by solar radiation being converted to heat radiation, in operation, the temperature and pressure in C4 rises to a point that satisfies the criteria for valve (23) to be opened. This valve is opened by computer direction. Valve (22) remains closed. Heated air therefore flows from C4 through the pipe (8) and the pressure in C4 falls. As a result of the fall in pressure in C4 the valve V4 loosens and with further fall in pressure opens and with further fall opens widely. Air flows from C3 into C4. This air in C3 is cooler than the air in C4. With the fall in pressure in C4 a further point is reached that satisfies the criteria for valve (23) to be closed. This valve is closed by computer direction. Air continues to flow from C3 into C4 until the pressure in C3 and C4 become equal. At this point the valve V4 closes. With further heating (of the chambers C3 and C4 indirectly by solar radiation) the pressure rise in C4 rises at a greater velocity than that of C3 and this rising pressure in C4 completes the closing of valve V4. The mixed air in C4 (from what remains in C4 and the contribution from C3), is initially, at the time of closure of valve V4, at a higher overall temperature than the air in C3 and with further heating of the chambers C3 and C4 this temperature difference is accentuated. As a result of further heating indirectly by solar radiation the temperature and pressure in C4 again rises to a point that satisfies the criteria for the valve (23) to be opened and so the cycle is repeated.

It may be assumed that under any given conditions of solar insolation there is an equal amount of solar radiation incident upon each of the four chambers, given that, in this description of the apparatus, each chamber is of equal size. It is also reasonable to assume that it follows that there is an equal amount of heat energy generated by each of the chambers as a result of this solar insolation. This is particularly true when the apparatus is mounted on a tracker, as further described infra. It is also particularly true when the apparatus is large, for example, the size of a football field.

Gay-Lussac's law states that the temperature and pressure of a gas are directly proportionate above Kelvin "more or less" and if shown in a graph the graph is linear. [T=QP, where Q is a constant]. Without wishing to be limited by theory in any way, it is proposed Gay-Lussac's law provides a foundation for the present invention, or at least some embodiments thereof. Air is a mixture of gases. Gay-Lussac's law applies to all the gases that exist in air. Dalton's law states that the total pressure of a mixture of gases is a summation of their partial pressures. [P=p1+p2+p3 / / / +pn].

In the "Description of Operation" so far it is easy to comprehend that with the opening of valve (23) the pressure in chamber C4 falls and when it falls below the pressure in chamber C3 the valve V4 has opened widely and that, as a result, air flows from C3 into C4. When the pressure in the two chambers becomes equal the valve V4 closes. What is perhaps more difficult to appreciate is that with further heating of the chambers (indirectly from solar radiation being applied equally to both chambers) the rate of temperature rise in chamber C4 has a slightly greater speed or more accurately velocity than the rate of temperature rise in chamber C3. Velocity may be defined, in this instance, as T2−T1 divided by delta t, where T2 is the temperature at a time t2 and T1 is the temperature at a preceding time t1 and delta t is a small amount of time, over which the two temperatures readings are taken. This assumes that each chamber receives the same amount of solar radiation, being of equal size.

By way of further explanation, and without wishing to be limited by theory in any way, the air in chamber C4 at the close of valve V4 is hotter (being a mixture of the air that remains in C4 and the received cooler air from C3 that has moved into C4) than the air in C3, but the pressures in the two chambers are equal. This equality in pressure in the two chambers only exists at the time of (opening and) closure of valve V4. With further heating of the chambers (indirectly from solar radiation being applied equally) both chambers acquire more heat. The reason why the rate of temperature rise in C4 is greater than in C3 is that the mass of air in C4 is less than the mass of the air in C3 despite the chambers having equal volumes and receiving the same quantity of solar radiation. Specifically, there are less atoms and molecules (including water vapour and carbon dioxide) in chamber C4 than there are atoms and molecules in C3. This means that each of the atoms and molecules in C4 have to individually take on a greater heat load that the atoms and molecules in C3. This further means that the atoms and molecules in C4 vibrate with an increasing violence and chaos over that of the atoms and molecules in C3. With the rise in temperature in C4 being at a greater velocity than the rise in temperature in C3 it follows that the rise in pressure in C4 rises at a greater rate than the rise in pressure in C3. This ensures the valve V4 becomes firmly shut.

With the fall in pressure in C3, as a result of the air flowing from it into C4, a point is reached whereby the pressure in C3 equals that in C2. The valve V3 therefore loosens and with further fall in pressure in C3, opens and then opens widely. Air flows from C2 into C3 until the pressure in C2 and C3 become equal. At this point the valve V3 closes. With further heating (of the chambers C2 and C3 indirectly by solar radiation) the pressure rise in C3 rises at a greater velocity than that of C2 and this rising pressure in C3 completes the closing of valve V3. The mixed air in C3 remains at a higher overall temperature than in C2.

With the fall in pressure in C2, as a result of the air flowing from it into C3, a point is reached whereby the pressure in C2 equals that in C1. The valve V2 therefore loosens and with further fall in pressure in C2, opens and then opens widely. Air flows from C1 into C2 until the pressure in C1 and C2 become equal. At this point the valve V2 closes. With further heating (of the chambers C1 and C2 indirectly by solar radiation) the pressure rise in C2 rises at a greater velocity than that of C1 and this rising pressure in C2 completes the closing of valve V2. The mixed air in C2 remains at a higher overall temperature than in C1.

With the fall in pressure in C1, as a result of the air flowing from it into C2, a point is reached whereby the pressure in C1 equals that in the atmosphere. The valve V1 therefore loosens and with further fall in pressure in C1, opens and then opens widely. Air flows through the air filter (24) and through the pipe 7 into C1 from the atmosphere, until the pressure in C1 reaches atmospheric pressure. At this point the valve V1 closes. With further heating of the chamber C1 (indirectly by solar radiation) the pressure rise in C1 rises and this rising pressure in C1 completes the closing of valve V1. The mixed air in C1 (from what remains in C1 and the contribution from the atmosphere) remains at a higher overall temperature than that of the atmosphere.

Thus, in operation, there is a cascade of events, a fall in pressure in C4 causing a transfer of air from C3 into C4, a fall in pressure in C3 causing a transfer of air from C2 into C3, a fall in pressure in C2 causing a transfer of air from C1 into C2 and finally a fall in pressure in C1 causing a transfer of air from the atmosphere into C1. As a result of this cascade of events there is a transfer of heat energy, contained in heated air, from C1 to C2, from C2 to C3 and from C3 to C4. As a result of this interchange, or better described, shunting, of heated air from C1 to C2, C2 to C3, C3 to C4 (as a result of release of air from C4), each of the chambers contain air that is at a higher temperature than its more proximal chamber (the more proximal chamber being (and is hereby defined as) a chamber that is more near to the front of the apparatus, "the front" meaning, as defined, in the description of FIG. 4). Therefore, in operation, with an adequate supply of solar radiation incident on the apparatus the air in C4 is very hot and may contain enough energy to drive a gas turbine.

Note that, it is not possible, for air to travel in a retrograde pathway i.e. from C4 to C3 to C2 to C1 and to the atmosphere, because of the design of the apparatus.

In operation, the cascade of events as described in the preceding paragraph, repeats itself over and over in a cyclical manner. The frequency of this cascade and the quantity of heated air released, is determined by a computer that controls valve (23). Valve (23) allows the release of heated air from C4 or shuts off the release. It is a different type of valve to valves V1, V2, V3 and V4 that are pressure release valves (see "Description of Valves" above. Valve (23) may be thought of as gate, that can open to varying degrees and close to varying degrees and close shut, if required. It is controlled by a computer. The computer relies on information supplied to it by sensors that are in each of the chambers and are in the atmosphere. The sensors supply continuous information about temperature and pressure in each of the chambers. The sensors are not shown in any of the figures or drawings of this apparatus. The computer receiving this information has the necessary software to compute the information supplied by the sensors and gives directives to a motor that, for example, may be an electric motor, that operates valve (23). The computer ensures the optimal operation of the apparatus. Note that, in operation, valve (22) remains shut.

The Computer

A computer may control any apparatus described herein. "A computer" or "the computer" has already been mentioned and discussed in the "Description of Operation" above. The role of the computer is now further discussed. The computer controls all the valves of the apparatus in the embodiment of FIG. 4, save for the valves V1, V2, V3 and V4 that are each a pressure sensitive valve. All the other valves that the computer controls are gating type valves. In a variation, the computer controls all of the valves of the apparatus including the valves V1, V2, V3 and V4, that in this variation are gating type valves and not pressure type valves. In a further variation of the apparatus the computer controls a motor that, in operation, causes a pump to pump. And in yet another variation the computer controls a heater placed in chamber C1. The computer controls a valve by turning on a motor, for example, an electric motor, that directly causes a valve to open and to shut. The degree of opening of a valve is also subject to computer control via its motor. Each valve that the computer controls has its own individual motor. The computer receives information by sensors placed in each chamber of the apparatus and sensors that are placed in the atmosphere. The sensors report information, on temperature and pressure in each of the chambers and on temperature and pressure in the atmosphere, to the computer. The computer has a sophisticated software that is at all times able to optimise the operation of the apparatus. The computer receives a myriad of information in a continuous stream from all of the sensors.

Typically, the apparatus delivers its end-product, that is heated air, intermittently. This is overcome, to a degree only, by having the supply of the apparatus delivered in small amounts but with great rapidity. The computer is able to compute the optimal arrangement. For example, it may release small amounts of hot air (by partially opening and then closing valve (23)) but cause the opening and closing of valve (23) to do so rapidly. Or, in conditions of high insolation, the computer may choose to release a larger amount, again with rapidity. Or, with lesser insolation, the computer may choose to release such an amount, but more slowly and with less rapidity. However, the computer may be so programmed that it is able to compute an optimal or near-optimal result for the given conditions of heat generation within the apparatus. The amount of heat generated within the apparatus may change from time to time and may change very rapidly indeed. As an example, a cloud coming between the sun and the apparatus on an otherwise sunny day, would cause a sudden diminution of solar radiation striking the apparatus, that has, as its consequence, a temporary reduction of useful heat production.

There may be times when the sensors in C4 satisfy the criteria for the release of heated air from its chamber, but because of changing atmospheric conditions it would be inappropriate to do so immediately and any release of air from C4 is best delayed in order for heating of one or more of the other chambers to "catch up" to its appropriate level, in normal operation. The computer is able to do this by basing its computation on the information received from all of the sensors within the apparatus and the sensors in the atmosphere. As an example, with a sudden decline in solar insolation, the computer may decide to delay the release of air from C4 and when release does occur it is only in very small amounts until the time that the conditions in another chamber or other chambers, have improved. Of course, with continued heating of C4, such release of air cannot be indefinite, as the apparatus may be put at risk. A paramount function of the computer is the protection of the apparatus.

Intermittent delivery of end-product may be at least partially overcome by the incorporation of a compartment that is heavily insulated. It receives heated air from the apparatus. In use, providing useful energy to, for example, a gas turbine, it is constantly being depleted of its heated air, so its pressure tends to constantly fall, save for the replenishment of heated air produced by the apparatus. It performs the useful function of being able to supply a more even stream of heated air, to be put to a useful purpose, for as an example only, to drive a gas turbine. A heat sink, that receives heated air from the apparatus, may prove to have a useful function.

Starting Up

When the apparatus the subject of this description is not in operation (for example, overnight) where there is no solar insolation at all, the apparatus cools down and all the chambers contain an equal amount of cool air (the pressure sensitive valve arrangement (V1, V2, V3 and V4) of the apparatus ensures it would not be otherwise). As morning progresses each of the four chambers C1, C2, C3 and C4 begin to heat up. Initially the heating of each chamber is even and when a certain amount of heating in the chambers has been acquired the apparatus needs to "start up". This "start up" is determined by computer direction as result of received information from sensors within the apparatus.

There are at least three ways to do this. First and most straightforwardly, the computer directs the opening of the venting valve, Valve (22) as shown in FIG. 5 and FIG. 5(*a*), that is a gating type valve, to open. The degree to which this valve opens is computer determined. This causes a decrease in pressure in C4. This fall in pressure causes the cascade of events to be initiated as described above in "Description of Operation". With further heating of the chambers, as a result of the conversion of solar radiation to heat radiation, enough useful heat begins to be produced. Under computer direction valve 22 is then shut off and valve (23) is partially opened. The amount of opening of valve (23) is determined by the computer, the computer constantly receiving information from sensors within the apparatus, that measure temperature and pressure. The computer therefore determines the optimal amount that valve (23) should be opened. The useful heat so produced is put to use, for example, to drive a gas turbine.

Two other methods are described only briefly. The first of these is to introduce a heater into chamber C1. For example, this may be an electric heater. The heater heats C1 causing a rise in pressure in C1 resulting in the flow of the hot air from C1 into C2 and the cascade of events is initiated. Secondly referring to FIG. 5(*a*), under computer direction, the gating type valve (20) is shut and the gating type valve (21) is opened to a small degree and the pump (80) causes a small quantity of air to be introduced into C1. This increases the pressure in C1 and air flows from C1 into C2 and the cascade of events is initiated. Once initiated, in normal operation, Valve (21) is fully shut and Valve (20) is fully opened. Valve (20) allows free air intake from the atmosphere into the apparatus. In both these two latter methods the roles of valves (22) and (23) are computer directed and is identical to the first method described.

Variations of the Apparatus Model Described

In the "Description of Operation" described above the apparatus has four chambers. However, there is no theoretical limitation to the amount chambers that may exist. For instance, there may be six chambers or there may be 10 chambers or there may be 30 chambers or more. In practical terms the maximum number of chambers is limited by the limitations of the apparatus.

The limitations to the apparatus are the robustness of its construction, its ability to withstand high temperatures and its ability to prevent heat losses. These will be discussed in more detail elsewhere in the description of this invention.

In a variation valves V2, V3 and V4, being pressure release valves, may be set at, say, 5 pounds of pressure per square inch. Such an arrangement means that the pressure release valve of the chambers C3, C2 and C1 (being valves V4, V3 and V2 respectively) have a delayed opening. In operation, this allows each chamber to generate more heat energy, before releasing its contents to a more distal chamber (C4 being an exception, as it discharges its contents externally). This may have some practical advantages. In a variation, upon this variation, various combinations of pressure settings of each of the valves V2, V3 and V4, may be set to a practical advantage. This does not include valve V1 that loosens when the pressure in C1 reaches atmospheric pressure and opens with further fall in pressure in C1.

In a variation to what has been described above all the valves of the apparatus are of the same type of valve as valve (23), being a gated valve, each valve being under direct computer control, to ensure the optimal operation of the apparatus. With the valves within the apparatus being gated valves, mechanically controlled under computer direction, these valves may be opened to varying degrees and tightly shut when necessary. A further advantage of computer directed mechanically controlled valves is that the valves V2, V3 and V4 are so constructed and of the type, whereby they can be adjusted to a desired and specific pressure setting and each of these valves can be individually so adjusted, as desired in operation by computer direction. So the pressure settings of valves V2, V3 and V4 may be adjusted by the computer, such as described in the previous paragraph and any variations therein, to best suit the prevailing conditions of solar insolation existing at the time, the computer relying on sensors both within and without the apparatus.

In a further variation, it may be desirable to have the apparatus operate with an intake pressure at a variance to the prevailing atmospheric pressure. Reference is made to FIG. 5(a). For example, to increase the pressure, the apparatus may be attached to a pump (80) as shown in FIG. 5(a). The pump is run by a motor, for example, an electric motor, and pumps compressed air into the apparatus. The motor is not shown in any drawing. The motor is controlled by a computer. The computer also controls a valve (21) between the pump and the apparatus, an air intake valve (20) and a venting valve (79). All these valves are gating valves. By closing valves (20) and (79) and opening valve (21), air from the atmosphere is able to be pumped into the apparatus. The rate of air intake into the apparatus is strictly controlled by a combination of control of the pumping rate and control of the valves (21) and (79) that, in operation with a pressure different to local atmospheric pressure, are opened to varying degrees, limiting the amount of air entering the apparatus to a desired pressure within the apparatus, the computer receiving feedback from sensors within the apparatus. In FIG. 5(a) is shown a pipe (7) with a valve (21). There is another valve (20) that connects to the pipe (7) and an air filter (24). A further valve (79), is a venting valve. The valve (20) is computer controlled and remains closed when the apparatus is in operation with a pressure different to local atmospheric pressure. The pipe (7) connects to a pump. The valves (21) and (79) are also computer controlled. Valve (21) controls the volume of air entering the apparatus. Valve (79) allows venting and helps control the volume of air entering the apparatus and helps avoid excessive pressures within the apparatus and protects the apparatus. A pipe (81) is the pump's air intake pipe capped by an air filter (82). Such apparatus may have an advantage. For example, a gas turbine may operate more efficiently at a higher pressure. By providing air at a higher pressure within the apparatus, energy is added to the heated air output of the apparatus that supplies such a turbine.

Heat Sink

Advantage may be provided by having a heat sink to receive the output from the apparatus. The intermittent nature of the output of the apparatus is thus overcome or lessened. A steady source of heated air is then able to supply, for example, a gas turbine. The Chambers In the description of the apparatus so provided there are four chambers of equal size (as shown in FIGS. 4, 5, 5(a) and 6). Each chamber has a top or roof (as defined) that consists of two sheets of glass (10) (11) with a vacuum (12) in between the sheets of glass, being held in a frame (14) (see FIG. 6) The frame (14) is capable of being attached to the rectangular box (1) and its partitions (3) (see FIG. 6). The glass is of a type that is best suited to allow the transmission of light and high energy infrared solar radiation and is also capable of being opaque to low energy and low medium energy infrared radiation. The glass is also of a type that is robust and can withstand high temperatures. Each chamber also has an absorber (5) that occupies the bottom (as defined) of its chamber and that extends at least most of the way up the walls of its chamber (see FIG. 6). The absorber preferably has a matte black surface and is capable of absorbing most of the solar radiation incident upon it. The absorber, preferably, consists of high hillocks, that considerably increase its surface area. Surrounding the absorber is a material with high heat insulating properties, that is also capable of withstanding high temperatures. This material forms both the casing (1) of the rectangular box and its partitions (3) (see FIG. 4). Each chamber has two ports (4). A pressure sensitive valve is found in each chamber and is labelled V1 for chamber C1, V2 for chamber C2, V3 for chamber C3 and V4 for chamber C4 (see FIG. 5 and FIG. 5(a)). The valves only allow the transmission of air from the front of the apparatus to the back of the apparatus i.e. from C1 to C2 to C3 to C4. They do not allow the transmission of air in the opposite direction i.e. from C4 to C3 to C2 to C1.

As a variation the top or roof (as defined) may consist of a single sheet of glass or in another variation it may be triple glazed with vacuums between the glass sheets.

As a person experienced in the art will appreciate, there are numerous variations in the design of the absorbing chambers that could be designed and made. As an example and at a variation to what has been described a heat resistant chamber may consist of a vacuum that completely surrounds the chamber, except for its ports. This may be compared to a vacuum flask. In such an example the surrounding vacuum may have a nipple to which is attached a valve that connects to a pump. The vacuum has sensors within it that report to a computer, and when the vacuum decreases below a desired quality, the computer causes the pump to be activated to maintain a necessary standard. In a near perfect vacuum, such as exists, for example, in outer space, the transmission of heat by conduction and convection becomes very difficult indeed.

The apparatus is preferably (and not essentially) mounted on a tracker that is equipped with sensors that can reliably detect the areas of maximum solar radiation in the sky. In general this would be the position of the sun in the sky, however under certain climatic conditions, for example, heavy cloud cover it may not.

The sensors send information to a computer that can direct a motor or motors, for example, the motors may be electric motors, and these motors, under computer direction, cause the roof of the apparatus (as defined) to lie in a plane perpendicular to that area in the sky of maximum solar radiation. Such an arrangement has an advantage in maximising the intake of solar radiation into the apparatus.

FIG. 7 is a drawing of a variation of the apparatus. It is identical to the embodiment of FIG. 6 save that the absorber is capable of absorbing from two sides of the rectangular box, both top or roof (as defined) and bottom (as defined). To facilitate this the bottom of the apparatus (as defined) has two sheets of glass separated by a vacuum in identical fashion to that of the top (as defined). A space, of the same volume to the upper chamber in this variation, separates the absorber from the bottom sheets of glass and a portion of the floor of the box (as defined) made of a heat resistant material does not exist. Its labelling is identical to that of FIG. 6.

Upon initial consideration, this variation may appear to provide no great advantage and would involve extra expense in its construction. However, with the placement of a relatively inexpensive reflector at a certain distance beneath the apparatus (for example, from a few feet in a small version of the apparatus, to much larger distances, depending on the size of the apparatus) and with further relatively inexpensive reflectors placed at a suitable angle on each side of the reflector beneath the apparatus and attached to that reflector a relatively large surface area has been created, the design of the reflectors being such as to reflect as much solar insolation onto the under-surface of the apparatus. This may considerably increase the total amount of solar radiation that a given apparatus is able to receive and as result convert that solar radiation to heat radiation. As an example only, such a combination of reflectors may consist of galvanised sheet metal. In much more expensive examples, such reflectors might consist of, for example, polished steel or glass mirrors.

Another variation of the apparatus

The apparatus may consist of compartments that are separated from one another by a (preferably short) pipe, or a series of compartments may be separated from another compartment or a series of compartments by a (preferably short) pipe. There is pressure type valve both at the entrance to the pipe and the outlet of the pipe inside the next immediately distal compartment. This allows the flow of air to enter the pipe from a more proximal compartment and to exit the pipe in the next immediate distal compartment, but does not allow the flow of air in the reverse direction. The pipe is heavily insulated and may be surrounded by a vacuum, that for instance and as an example only, may consist of two stainless steel tubes with a vacuum lying in between, that is maintained by a pump that connects to the vacuum by a valve, the details of which can be found elsewhere, as a variation, in the description of this invention. The advantage gained by this variation is that each compartment or series of compartments is adapted to ready customization. As such, as will readily be appreciated by those experienced in the art, more distal compartments in a series of compartments, that are now in this variation broken up variably but connected by a pipe or pipes as designed, can be progressively reinforced. For example, the glass sheets of the compartments can be progressively thickened, to withstand an increasing temperature and pressure within each chamber, as one progresses distally within the apparatus. Some attenuation of solar radiation occurs within a glass pane when solar radiation otherwise passes a translucent sheet of glass. With increasing thickness of a glass pane, designed to strengthen the glass pane, there is an increasing attenuation of solar radiation that otherwise passes the glass pane. There is therefore a practical limitation to which this can be carried out.

A further variation of the apparatus

In a further variation, the apparatus is devoid of valves V1, V2, V3 and V4 [FIG. 5a]. The valves may be replaced by portals which are small relative to the surface area of the partitions between chambers and the surface area at the front and the area at the back of the apparatus. A pump [80, FIG. 5a] pumps fluid (such as air) at low-pressure through the apparatus. The pump is under computer control which can vary its pressure output. Sensors exist in all chambers of the apparatus and external to the apparatus and feed information into the computer. The computer controls gating valve 23 [FIG. 5a] and all valves external to the apparatus, these valves being 20, 21, 22, and 79 [FIG. 5a]. In operation this provides a continuous and not intermittent movement of air through the apparatus. This movement of air through the apparatus is small but it may be improved by the output of the pump [80, FIG. 5a] that is under computer control to give an optimal result of heat energy output that is in turn dependent on other factors notably the intensity of solar insolation.

Clearly with higher pump output to produce a larger volume of end product (that is heat energy of a desired quality) the pressure of the air in the chambers is considerably increased, as the volume of the chambers is fixed, volume and pressure in a volume of fixed dimension, being inversely directly proportional, in order to maintain an improved flow of air through the small portal of a chamber and the chambers of the apparatus. This may be detrimental in allowing heat energy (the air being denser) to escape from one chamber to a retrograde chamber, that is undesirable. Nevertheless, the substance of this variation is that because the portal is small relative to the partitions that they penetrate that are large, the proportion of heat energy moving in the retrograde direction that takes place is reduced. The loss of energy in the retrograde direction becomes more critical as the temperature of a chamber increases. For example, to drive a turbine efficiently the temperature of the air, should be at or above 600° C. Accordingly, the higher the temperature the less efficient this variation.

In the description of the apparatus of this invention, without this variation, there is no reason why the valves V1, V2, V3 and V4, could not be made small relative to the partitions that they penetrate in order to further contain heat energy losses in the retrograde direction. Furthermore, there is no reason why the valves could not be designed to have good thermal insulation properties themselves, when closed, to prevent loss of heat energy in the retrograde direction.

Reasons why in this variation the apparatus may further reduce retrograde heat loss may include having a short pipe connection between chambers, an asymmetrically set portal between chambers and tilting of the apparatus. These are now briefly discussed. A pipe connection between chambers may absorb photons of heat radiation that are directed at a slight angle that would otherwise pass through unimpeded a short portal. A portal sited near the bottom of the apparatus deals directly with the cooler air in a chamber and allows preferential passage of the cooler air in the retrograde direction. Tilting of the apparatus that is, for example, a hot water system mounted on the roof of a house, mounted at a fixed angle, directs convection movement of heat energy carried in the air of a chamber to the uppermost portion of that chamber and if the tilt of the apparatus is such that the chamber that carries the hottest air is the uppermost, (for example chamber 4 in FIG. 5a), then the hottest air, carried by convection, lies at the uppermost portion of the hottest most distal chamber. Cooler air is therefore, in that chamber, likely to pass in the retrograde direction preferentially to the hotter air.

Of course, there is no reason why, in this variation, the apparatus could not operate as is described in the main description of this invention, intermittently and in a passive way, without the need of a pump (refer to FIG. 5). However, heat energy losses would be continuous through each cycle.

As in all descriptions and variations of this apparatus, it is generally preferred to curtail heat losses as far as possible from the apparatus. This of course includes any piping between chambers and may entail the usage of a vacuum around such piping and indeed the entire apparatus in a manner similar to the evacuated tube technology as known and used in prior art hot water systems.

It is acknowledged that the above-described variation devoid of valves is inferior to a valve-operated apparatus, and is included more so for the sake of completeness. Inferior performance results from the necessarily small portal between chambers (required to limit retrograde heat energy losses), but also resulting in a significant restriction of fluid flow from a proximal chamber to an adjacent distal chamber. This restriction in flow may be alleviated to some extent by increasing the pressure within the apparatus, as described above. Even so it is likely, particularly, with the limitation on forward fluid flow (from a chamber proximal to the fluid source to a chamber distal to the fluid source), retrograde heat loss (from hotter to cooler) is likely to be more efficient than forward fluid flow, thereby reducing the efficiency of this variation to the apparatus.

Limitations in certain embodiments of the Apparatus

The limitations to the apparatus are the robustness of its construction, its ability to withstand high temperatures and its ability to prevent heat losses.

The apparatus is preferably of robust construction as it is constantly exposed to the elements and is regularly heated and cooled in an extreme way. The apparatus should ideally have a strength to withstand regular heating, both external to it from the sun and internal to it, from the heat that it generates and to withstand cooling after heating, for example, at night. This is less critical in the more proximal compartments but becomes progressively more critical in the distal compartments. This is because the compartments progressively acquire more heat and are therefore hotter than a proceeding compartment. It follows that the air in such compartments is at a progressively higher pressure (Gay-Lussac's law that states that there is a linear relationship between gas temperature and pressure above Kelvin). Therefore, the robustness of the compartments must increase progressively moving from the front of the apparatus (as defined) to the back of the apparatus (as defined).

In addition to its other qualities the apparatus should be constructed of materials that have similar coefficients of expansion. Ideally, they should have the same coefficients of expansion. This means that there is less tendency for the apparatus to pull itself apart as it heats and as it cools.

The apparatus should clearly be made of materials that can withstand high temperatures. Again this is less critical in the more proximal compartments but becomes progressively more critical in distal compartments.

It is most important to contain heat losses. Is it is impossible to prevent all heat loss, however every effort should be made to reduce the loss of heat from the apparatus. This becomes more critical as one moves distally through the apparatus. This is so, at least in part, because the loss of heat from an object by radiation varies to the fourth power of temperature above Kelvin (the Stefan-Boltzmann law applies to a black body). The apparatus is not a black body, but the wider interpretation of the law can be extended to apply to any object with heat. One way to reduce heat loss is to place a vacuum between two sheets of glass as described in a model (that otherwise has many variations), as described herein. The vacuum should be of sufficiently high quality to significantly impair heat loss due to conduction and convection. A variation has already been described herein whereby a vacuum completely surrounds each chamber or compartment, except for its ports. An analogy has already been made to a vacuum flask. In this variation the vacuum has a nipple to which is attached a gating type valve that is computer controlled. The valve connects to a pump. The vacuum has sensors placed within it that report to the computer, and when the vacuum falls below a desired standard, the computer causes the pump to be activated to maintain the necessary standard. In this variation the two layers of the vacuum may consist of, as an example only, high-quality stainless steel of a good strength, that form the bottom and sides and front and back of a compartment, the top of the compartment being two glass sheets, separated by a vacuum, that in this variation are attached sealingly to the two layers of steel, the vacuum between the glass sheets being in continuum with the vacuum between the two stainless steel sheets. Within the compartment so created is an absorber. The vacuum between the two layers of steel and the glass sheets is maintained by a pump connected indirectly to the vacuum and relying on sensors within the vacuum as already described supra. Such a variation would, no doubt, be expensive to construct but it may be well worthwhile, especially if employed, if only in the more distal compartments or chambers. In such an arrangement the conduction and convection of heat is greatly reduced and the low energy infrared radiation and low medium energy infrared radiation, generated and radiated by the absorber, is largely unable to escape the compartment or chamber. Heat loss is therefore greatly reduced in this variation.

As will be apparent from this detailed description, various embodiments of the apparatus and various methods of operation are reliant on a computer processor and an appropriate set of processor-executable instructions. The role of the computer processor and instructions may be central to the operation of the apparatus in so far as digital and/or analogue signals are received form sensors, and digital and/or analogue signals are transmitted to valves. Accordingly, the apparatus, methods and systems described herein may be deployed in part or in whole through one or more processors that execute computer software, program codes, and/or instructions on a processor. Most typically, the processor will be self-contained and physically a part of the apparatus. However, it is possible that the processor may be part of a server, client, network infrastructure, mobile computing platform, stationary computing platform, or other computing platform. A processor may be any kind of computational or processing device capable of executing program instructions, codes, binary instructions and the like.

The processor may be or may include a signal processor, digital processor, embedded processor, microprocessor or any variant such as a coprocessor (math co-processor, graphic co-processor, communication co-processor and the like) and the like that may directly or indirectly facilitate execution of program code or program instructions stored thereon. In addition, the processor may enable execution of multiple programs, threads, and codes.

The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere.

Any processor or a mobile communication device or server may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In some embodiments, the processor may be a dual core processor, quad core processors, other chip-level multiprocessor and the like that combine two or more independent cores (called a die).

The methods and systems described herein may be deployed in part or in whole through one or more hardware components that execute software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, computers, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, computers, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, calculations, algorithms, and instructions described herein may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, 4G, EVDO, mesh, or other networks types.

The methods, programs codes, calculations, algorithms and instructions described herein may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon.

Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on computer readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on computers through computer executable media having a processor capable of executing program instructions stored thereon as a monolithic software structure, as standalone software modules, or as modules that employ external routines, code, services, and so forth, or any combination of these, and all such implementations may be within the scope of the present disclosure.

Furthermore, the elements depicted in any flow chart or block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a computer readable medium.

The Application software may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The invention may be embodied in program instruction set executable on one or more computers. Such instructions sets may include any one or more of the following instruction types:

Data handling and memory operations, which may include an instruction to set a register to a fixed constant value, or copy data from a memory location to a register, or vice-versa (a machine instruction is often called move, however the term is misleading), to store the contents of a register, result of a computation, or to retrieve stored data to perform a computation on it later, or to read and write data from hardware devices.

Arithmetic and logic operations, which may include an instruction to add, subtract, multiply, or divide the values of two registers, placing the result in a register, possibly setting one or more condition codes in a status register, to perform bitwise operations, e.g., taking the conjunction and disjunction of corresponding bits in a pair of registers, taking the negation of each bit in a register, or to compare two values in registers (for example, to see if one is less, or if they are equal).

Control flow operations, which may include an instruction to branch to another location in the program and execute instructions there, conditionally branch to another location if a certain condition holds, indirectly branch to another location, or call another block of code, while saving the location of the next instruction as a point to return to.

Coprocessor instructions, which may include an instruction to load/store data to and from a coprocessor, or exchanging with CPU registers, or perform coprocessor operations.

A processor of a computer of the present system may include "complex" instructions in their instruction set. A single "complex" instruction does something that may take many instructions on other computers. Such instructions are typified by instructions that take multiple steps, control multiple functional units, or otherwise appear on a larger scale than the bulk of simple instructions implemented by the given processor. Some examples of "complex" instructions include: saving many registers on the stack at once, moving large blocks of memory, complicated integer and floating-point arithmetic (sine, cosine, square root, etc.), SIMD instructions, a single instruction performing an operation on many values in parallel, performing an atomic test-and-set instruction or other read-modify-write atomic instruction, and instructions that perform ALU operations with an operand from memory rather than a register.

An instruction may be defined according to its parts. According to more traditional architectures, an instruction includes an opcode that specifies the operation to perform, such as add contents of memory to register—and zero or more operand specifiers, which may specify registers, memory locations, or literal data. The operand specifiers may have addressing modes determining their meaning or may be in fixed fields. In very long instruction word (VLIW) architectures, which include many microcode architectures, multiple simultaneous opcodes and operands are specified in a single instruction.

Some types of instruction sets do not have an opcode field (such as Transport Triggered Architectures (TTA) or the Forth virtual machine), only operand(s). Other unusual "0-operand" instruction sets lack any operand specifier fields, such as some stack machines including NOSC.

Conditional instructions often have a predicate field—several bits that encode the specific condition to cause the operation to be performed rather than not performed. For example, a conditional branch instruction will be executed, and the branch taken, if the condition is true, so that execution proceeds to a different part of the program, and not executed, and the branch not taken, if the condition is false, so that execution continues sequentially. Some instruction sets also have conditional moves, so that the move will be executed, and the data stored in the target location, if the condition is true, and not executed, and the target location not modified, if the condition is false. Similarly, IBM z/Architecture has a conditional store. A few instruction sets include a predicate field in every instruction; this is called branch predication.

The instructions constituting a program are rarely specified using their internal, numeric form (machine code); they may be specified using an assembly language or, more typically, may be generated from programming languages by compilers.

Those skilled in the art will appreciate that the invention described herein is susceptible to further variations and modifications other than those specifically described. It is understood that the invention comprises all such variations and modifications which fall within the spirit and scope of the present invention.

While the invention has been disclosed in connection with the preferred embodiments shown and described in detail, various modifications and improvements thereon will become readily apparent to those skilled in the art.

Accordingly, the spirit and scope of the present invention is not to be limited by the foregoing examples, but is to be understood in the broadest sense allowable by law.

What is claimed is:

1. An apparatus for heating a fluid using solar energy, the apparatus comprising:
   (i) a fluid source,
   (ii) a first chamber comprising a fluid inlet comprising a first controllable valve configured to allow controlled substantially one-way movement of a fluid from the fluid source to the first chamber,
   (iii) a second chamber comprising a fluid outlet comprising a second controllable valve configured to allow the controlled substantially one-way movement of a fluid internal the second chamber to a further chamber or external the apparatus, and
   (iv) a fluid connection between the first and second chambers having a third controllable valve configured to allow controlled substantially one-way movement of a fluid from the first chamber to the second chamber,
   wherein each of the first and second chambers is substantially fluid tight and configured as a solar collector to heat a fluid therein, and the apparatus is configured such that in operation and under incident solar radiation a fluid is heated in each of the first and second chambers and upon a rise in pressure of the fluid, the fluid is moved in a controlled manner substantially one-way from the first chamber to the second chamber, and from the second chamber to a further chamber or external the apparatus,
   and wherein the apparatus is configured such that, in operation, the first controllable valve and the third controllable valve intermittently and automatically open and close in a coordinated manner with each other and with the second controllable valve that intermittently opens and closes, such that the second chamber commences reception of fluid from the first chamber after the second chamber has supplied fluid to a further chamber or external the apparatus,
   and wherein, in operation, by the movement of fluid, from the second chamber to a further chamber or external the apparatus, the second chamber loses some of its heat energy, that is that portion held within its lost fluid,
   and wherein by the movement of fluid from the first chamber to the second chamber, the second chamber regains a portion of its lost heat energy held within the fluid that it receives, and the first chamber loses that portion of its heat energy that is that portion that is held within its lost fluid,
   and wherein by the movement of fluid from the fluid source to the first chamber, the first chamber regains a portion of its lost heat energy held within the fluid that it receives,
   and wherein by the redistribution of the heat energy in the second chamber and by the redistribution of heat energy in the first chamber, the second chamber contains fluid that is hotter than the first chamber,
   wherein the fluid outlet of the second chamber is configured to be controllable by a human user or a processor functioning under software instructions and wherein the fluid outlet of the second chamber is configured to intrinsically control movement of a fluid from the first chamber to external the second chamber.

2. The apparatus of claim 1, comprising one or more sensors configured to sense any one or more of: the pressure of a fluid within the first chamber (or a proxy thereof), the temperature of a fluid within the first chamber (or a proxy thereof), the pressure of a fluid within the second chamber (or a proxy thereof), the temperature of a fluid within the second chamber (or a proxy thereof), the temperature of a fluid external the apparatus (or a proxy thereof) and the pressure of a fluid external the apparatus (or a proxy thereof), wherein the sensor is in operable connection with fluid outlet of the second chamber such that upon the one or more sensors sensing one or more predetermined temperature(s) and/or pressure(s) the outlet moves from a first fluid flow state to a second fluid flow state, wherein the first or second fluid flow state is independently zero fluid flow, maximum fluid flow or an intermediate fluid flow, wherein the first and second chambers are configured to contain a fluid under pressure.

3. The apparatus of claim 2, wherein the first and the second chambers are each configured to heat a fluid internal thereto either via incidence of solar radiation on a chamber wall or incidence of solar radiation on a radiation absorber within the chamber.

4. The apparatus of claim 1, comprising a solar radiation absorber internal each of the first and second chambers, and wherein each of the first and second chambers comprises a wall or a wall portion allowing incoming solar radiation to pass internal the chamber and incide on the solar radiation absorber, and wherein the solar radiation absorber has a convoluted surface so as to increase surface area available to receive incident solar radiation.

5. The apparatus of claim 1, wherein the first and second chambers are thermally isolated from (i) each other, and (ii) the environment, comprising a fluid within the first and second chambers, and wherein the fluid is a gas (such as air) or a liquid (such as water or other flowable heat transfer medium).

6. The apparatus of claim 1, configured such that after being exposed to solar radiation such that a fluid in the first and second chamber are heated and pressurized to a supra-atmospheric pressure, and when a portion of the heated fluid in the second chamber is allowed to exit therefrom via the fluid outlet of the second chamber, fluid remaining in the second chamber is heated by the solar radiation at a rate faster than fluid in the first chamber.

7. The apparatus of claim 1, comprising one or more intermediate chambers disposed between the first and second chambers to form a chain of chambers defining a fluid path from the first chamber of the chain to the last chamber of the chain, each of the intermediate chambers being in a fluid connection with an adjacent chamber of the chain by way of a fluid connection configured to allow substantially one-way movement of a fluid sequentially from the first chamber to the chain of intermediate chambers, and from the chain of intermediate chambers to the second chamber.

8. The apparatus of claim 1, wherein any or all of the one or more intermediate chambers has a feature as defined for the first or second chamber, and wherein the first and second chamber, and any intermediate chamber (where present), are shaped and/or dimensioned so as to be substantially identical to each other.

9. A system for heating a fluid, the system comprising a fluid source in fluid connection with the fluid inlet of the first chamber of the apparatus of claim 1.

10. The system of claim 9, wherein the heated fluid is drawn from the outlet of the second chamber and used directly, or used indirectly in which case the system further comprises a heat exchanger and the system configured such that a heated fluid drawn from the outlet of the second chamber is conveyed to the heat exchanger and used to heat a second fluid in contact therewith.

11. A system for performing work, the system comprising a first sub-system being the apparatus of claim 1 and a second sub-system being a work output component configured to directly or indirectly utilize thermal energy or kinetic energy present in a fluid that has exited the outlet of the second chamber.

12. The apparatus of claim 1, further comprising the controllable valves being configured to be controllable by a human user or a processor functioning under software instructions.

\* \* \* \* \*